United States Patent [19]
Patrick

[11] Patent Number: 5,469,553
[45] Date of Patent: Nov. 21, 1995

[54] EVENT DRIVEN POWER REDUCING SOFTWARE STATE MACHINE

[75] Inventor: Paul R. Patrick, Peyton, Colo.

[73] Assignee: Quantum Corporation, Milpitas, Calif.

[21] Appl. No.: 357,778

[22] Filed: Dec. 16, 1994

Related U.S. Application Data

[63] Continuation of Ser. No. 870,135, Apr. 16, 1992, abandoned.

[51] Int. Cl.⁶ .............................. G06F 1/04; G06F 1/32; G06F 9/00
[52] U.S. Cl. .................. 395/750; 395/375; 364/238.3; 364/263.2; 364/273.1; 364/273.5; 364/DIG. 1
[58] Field of Search .................... 395/375, 750, 395/550, 775

[56] References Cited

U.S. PATENT DOCUMENTS

| | | | |
|---|---|---|---|
| 4,203,153 | 5/1980 | Boyd . | |
| 4,293,927 | 10/1981 | Hoshii . | |
| 4,317,180 | 2/1982 | Lies ......................................... | 364/707 |
| 4,381,552 | 4/1983 | Nocilini et al. . | |
| 4,494,010 | 1/1985 | Donnelly ................................... | 307/33 |
| 4,667,289 | 5/1987 | Yoshida et al. . | |
| 4,669,059 | 5/1987 | Little et al. . | |
| 5,003,501 | 3/1991 | Podkowa ................................. | 364/569 |
| 5,025,387 | 6/1991 | Frane ....................................... | 364/493 |
| 5,203,003 | 4/1993 | Donner .................................... | 395/800 |
| 5,218,704 | 6/1993 | Watts, Jr. et al. ....................... | 395/750 |
| 5,241,680 | 8/1993 | Cole et al. ............................... | 395/750 |
| 5,287,523 | 2/1994 | Allison et al. ........................... | 395/725 |
| 5,345,347 | 9/1964 | Hopkins et al. .......................... | 360/71 |

Primary Examiner—Kevin J. Teska
Assistant Examiner—Agni Mohamed
Attorney, Agent, or Firm—David B. Harrison

[57] ABSTRACT

For a computer system or a subsystem thereof having electrical components, a method and apparatus for a collection of event driven software state machine of the type where each state machine is separately operable at differing levels of power consumption, and where the transitions from state to state are as a direct result of input events. Each of the state machines is programmatically biased to operate the state machine at a lowest possible power, and state machines processing event of a higher priority do so at the expense of state machines processing events having a lower priority.

10 Claims, 16 Drawing Sheets

OPERATION STATE MACHINE

| HOST | DRIVE | DISK | SERVO | SPINDLE | SECTOR |
|---|---|---|---|---|---|
| HstSM | DrvSM | DskSM | SrvSM | SpnSM | SctSM |
| 300 | 400 | 430 | 450 | 470 | 490 |

CONTROL STATE MACHINE

| POWER | SLEEP | TRAP | EVENT |
|---|---|---|---|
| PwrSM | SlpSM | TrpSM | EvnSM |
| 500 | 530 | 540 | 550 |

TIMING

| TIMER | CLOCK |
|---|---|
| TmrSM | ClkSM |
| 560 | 570 |

MANUFACTURING

| RECEIVE | TRANSMIT | TESTSM |
|---|---|---|
| RcvSM | SndSM | TstSM |
| 580 | 600 | 610 |

ENGINEERING

| BREAK | TRACE | OPCODE |
|---|---|---|
| BrkSM | TrcSM | OpcSM |
| 630 | 650 | 670 |

PORTABLE COMPUTER

DISK DRIVE

STATE DIAGRAM

OPERATION STATE MACHINE
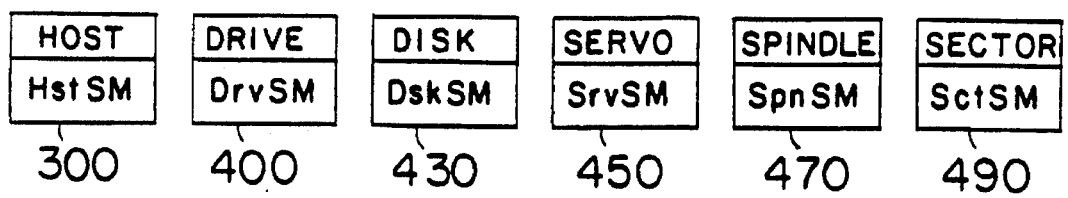
CONTROL STATE MACHINE
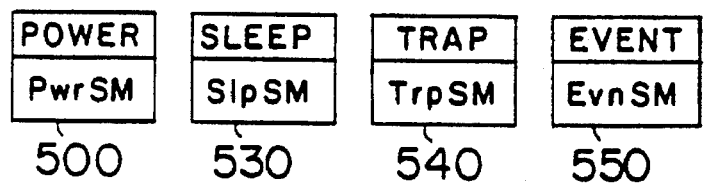
TIMING
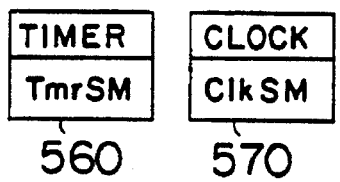
MANUFACTURING
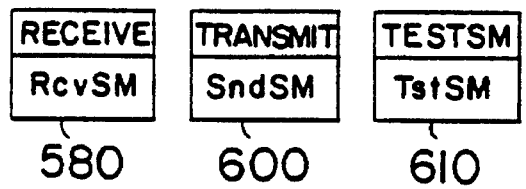
ENGINEERING
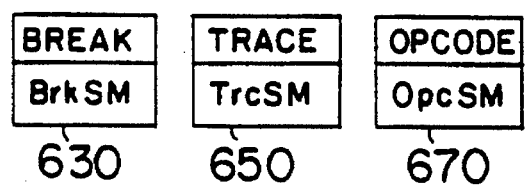
FIG. 5B EXAMPLE STATE MACHINE
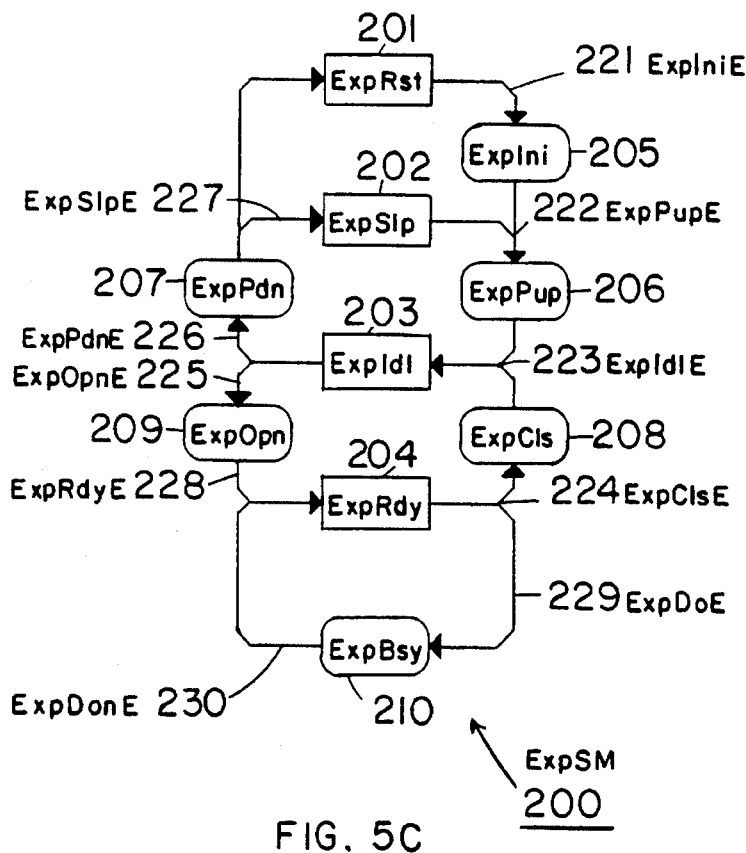
FIG. 5C
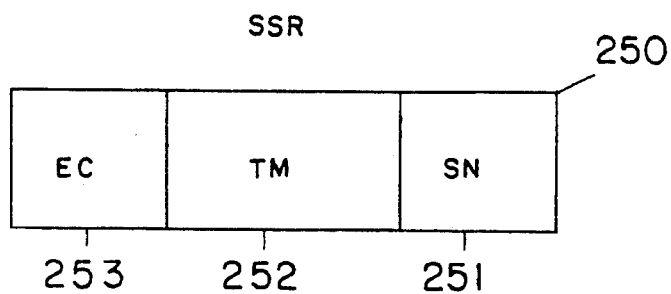
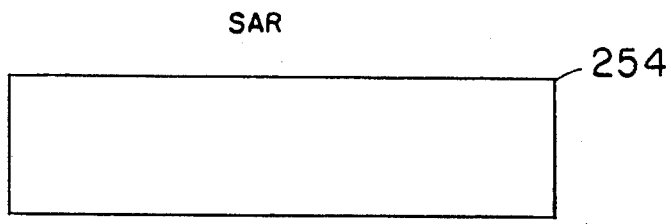
FIG. 6

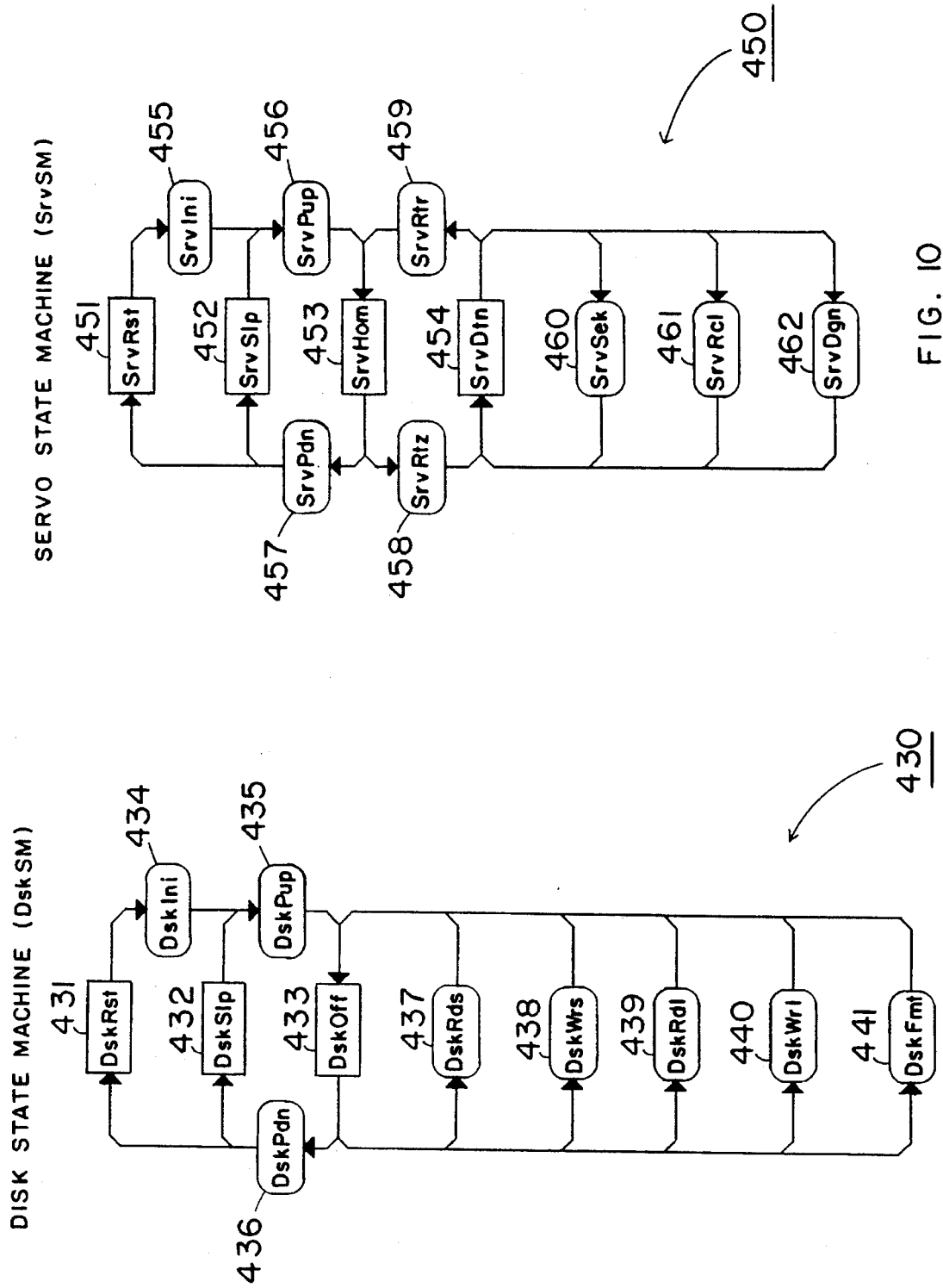

SPINDLE STATE MACHINE (SpnSM)

SECTOR STATE MACHINE (SctSM)

POWER STATE MACHINE (PwrSM)

CLOCK STATE MACHINE (ClkSM)

RECEIVE STATE MACHINE (RcvSM)

TRANSMIT STATE MACHINE (SndSM)

TEST STATE MACHINE (TstSM)

EVENT DRIVEN POWER REDUCING SOFTWARE STATE MACHINE

REFERENCE TO RELATED APPLICATION

This is a continuation of U.S. patent application Ser. No. 07/870,135, filed on Apr. 16, 1992, now abandoned.

FIELD OF THE INVENTION

This invention relates to computer systems, and is concerned with power conservation in operation of computer systems.

BACKGROUND OF THE INVENTION

Modern computers in operation are busy. Keyboards are stroked, screens flicker, and millions of bytes are transformed each second. With the recent prevalence and popularity of portable computers, there is a real need for computers that consume less power. With portable computers, such as laptops, power consumption is a major concern for the system designer. It is well-known that dead batteries are the major cause of failure of portable computers and dead batteries invariably lead to user dissatisfaction. In fact, most battery operated computer systems will inevitably cease to function after hours of operation, unless the batteries are replaced or recharged.

Conventional low-power computer systems generally run at lower clock rates or slower speeds, which often results in reduced reliability and performance. One technique that is sometimes used to improve the performance of a conventional computer system is to allow certain portions or subsystems of the computer to operate autonomously by providing the subsystem with programmable control in the form of, for example, a microprocessor and associated support structures such as memory, and bus interfaces. With an autonomous subsystem, a large number of the subsystem operations can be handled in parallel by the microprocessor, making the host system available for other functions.

An example of an autonomously operating subsystem may be found in input/output (I/O) controllers. I/O controllers generally control the data transfer between the various peripheral devices and the computer. For example, a typical I/O controller, such as a video display terminal (VDT) controller, in response to keystrokes (input data) typed by the user will cause the computer to transfer information (output data) to a display screen. Similarly, a disk controller, in response to user initiated events from the host computer will transfer files between the host CPU and a disk drive. The complex device control functions that are involved in data transfers are generally processed autonomously by the I/O subsystem.

One characteristic of I/O controllers is that they operate sporadically, generally only in response to externally generated events. A VDT I/O controller, as an obvious example, even when used by a fast typist, only needs to be active a couple of times a second, with frequent long waits between key strokes while the user studies and edits displayed information. Similarly, a disk I/O controller may be requested to transfer a file for display or editing purposes from time to time. The augmented file is written back to the disk minutes, or perhaps hours later. In typical conventional computers, the subsystems spend a disproportionate amount of time, while surreptitiously consuming power, busily polling peripheral devices to determine if an attention requiring event has occurred.

State machines have previously been used for achieving fault tolerance, and for implementing decentralized control in distributed systems. State machines, because of their empirically provable predictable behavior, have also been used to implement complex language compilers, report generators, bus protocols, and network processors. However, state machine notation, unlike a traditional flowchart, is extremely difficult for most users to conceptualize and therefore is normally not used in general data processing applications.

Simplistically articulated, a state machine typically converts a time series of event stimuli or input data through some function into a time series of responses or output data. More formally, a state machine (SM) is a mathematical model to describe the structure and operation of a machine comprising:

a set of states, $S=\{S_0, \ldots, S_n\}$ a set of events, $E=\{e_0, \ldots, e_m\}$ a next state function, $F: S \times E = s$ an output function, $Q: S \times E = a$ or $r$, and a starting state, $S_0$.

In operation, the machine starts in an initial state so, and a sequence of time driven events selected from the set E is applied to the machine. The next state s of the machine, after application of an event, is determined by the next state function F. The output resulting from a state transition is determined from the function Q. If the output is a, the event has been accepted and processed, if the output is r, the event has been rejected or not processed.

Since the machine can assume any one of its next states only in response to a predeterminable number of events, the maximum number of states that the machine can assume is easily computable, hence state machines of this type are sometimes known as finite state machines. Because of the predictable nature of state machines, computer systems implemented by using this technique are generally more reliable than systems implemented by using more conventional techniques, such as traditional decision based flow-charts or data based structured charts.

Any state of the machine is the memory of sufficient history of the machine to determine future behavior. In terms of the state machine, this means sufficient information to determine both an output and a next state if the present inputs are known. State machines are generally pictorially represented by a directed graph where each node corresponds to a state of the machine, and each directed arrow indicates a possible transition from one state to another, in response to a particular event. In state diagrams, the first or top node, as depicted further herein, will be assigned to the initial state (so) of a machine.

Now, during operation of a conventional state machine, the stimulating events are generally presented in an orderly manner. For example, a state machine for a language compiler or report generator may read a source file in order to determine the sequence of stimulating events, such as the characters or words that constitute the source text. Similarly, a state machine for a network or bus protocol processor usually continuously scans the input lines to determine if new events in the form of communication data packets are present. In other words, these types of data driven state machines constantly monitor the sources of input events. Such data driven state machines are relatively responsive and efficient as long as the events necessary to transition or operate the machine appear as a constant stream. However, if the time interval between events is extended or sporadic, valuable computer resources, such as power, are wasted while the state machine is busily looking for a nonexistent next event to process.

Improvements have been made to such traditional data driven state machines by providing them with a clocking mechanism. Instead of constantly monitoring the sources of input events, the state machine only examines the source of events on a periodic basis as determined by the clocking mechanism. Although these types of clock driven state machines consume less power by polling the input source less frequently, they do have a disadvantage in being less responsive. Any events that are generated between clock pulses are not recognized and processed until the expiration of a predetermined time interval. Even if the clock rate is adjusted in accordance with the rate of event presentation, optimal responsiveness is difficult to achieve.

SUMMARY OF THE INVENTION

For a computer system or a subsystem thereof having hardware and software components, there is provided a method, and apparatus for implementing that method, comprising a cooperatively interconnected set of event driven software state machines. The event driven software state machines, in one embodiment of the invention, improve the performance of the system by reducing the time required to respond to and process state machine events. In addition, the event driven software state machines in another embodiment of the invention are biased to operate the components of the computer system or subsystem at reduced power levels.

Each of the state machines includes a plurality of states, each state being responsive to a plurality of events. Events can be generated by either hardware or software components, including components of the state machines themselves. The states of the state machine include an initial state, having a lowest level of power consumption, and a state having a higher level of power consumption.

In operation of a state machine embodying the invention, transitions from state to state advantageously occur substantially forthwith upon the occurrence of the event. That is, the presence of the stimulating event essentially directly drives the operation of the state machine. In the absence of stimulating events the state machine is essentially in a quiescent or steady state. During the processing of an event, the state machine transits through transitional states until a subsequent steady state is reached.

Furthermore, each state of each of the state machines, in one embodiment of the invention, is programmatically biased to urge the state machine to operate at a lowest possible power level. That is, each state in response to an event, supplies power only to those components required to process a particular event. Upon the completion of the processing of the event, power is selectively withdrawn or reduced from components no longer required for the operation of the system as the state machine transitions to a steady state having a lower power level. In other words, in the absence of events to process, the state machine generally transitions to a state having the lowest level of power consumption possible.

The various state machines operate in a cooperative fashion by optimizing the distribution of power over all of the components to ensure that performance is not compromised. Each of the various state machines is generally capable of monitoring the activities of other state machines so that components used on a shared basis by various state machines are not turned off or have their power reduced unnecessarily. In essence, the power/performance curve for the computer system or subsystem is maximized over the collection of state machines. In addition, each of the various state machines has a predetermined priority level indicative of the relative immediacy with which it needs to respond to events. That is, state machines which process events that need substantially instantaneous responses are assigned a higher priority level than state machines which process events of lesser urgency. Higher priority events will generally interrupt and suspend the processing of lower priority events.

In one embodiment of the invention, the disk drive I/O subsystem of a portable computer system is implemented as a collection of event driven software state machines. The components of the disk I/O subsystem include a head and disk assembly (HDA), and a controller having a bus interface coupled to a bus for communicating with the host computer. The electrical components of the HDA include a disk spindle motor for rotating a disk, a voice-coil for radially positioning an actuator arm, and a read/write head mounted on the arm for reading and writing information on the disk.

The electrical components of the controller include a microprocessor, clock and memory for managing the controller functions by means of the various state machines. Also included are specialized integrated circuits chips connected to the microprocessor for driving the spindle, actuator arm, read/write head, and bus interface. There also is an application specific integrated circuit (ASIC) interconnecting the various components for coordinating the activities of the microprocessor, and the various driver chips.

The collection of event driven software state machines include "operation", "control" "timing" "manufacturing" and "engineering" state machines. The operation state machines generally directly control the various physical and electrical components of the subsystem. The control state machines coordinate the activities of all of the state machines in conjunction with the timing state machines. These state machines communicate with the host computer over an industry standard interface, such as IDE/AT or SCSI.

The manufacturing and engineering state machines are used during the assembly, and testing of the subsystem permitting the complete operational exercising and testing of the drive without the presence of a host. The manufacturing state machines communicate with a testing device over a simple serial port. The manufacturing state machines provide the ability to load the software of the state machines into the disk drive memory, and to factory format and verify the operation of the disk drive prior to shipping, making the disk drive software configurable. The engineering state machines are used by the design engineer of the system to facilitate diagnostic testing and debugging.

The operation state machines include a host, drive, disk, servo, spindle, and sector state machine for operating the various electrical and physical components of the controller and HDA. For example, the host state machine is responsible for communicating with the host over the bus via the bus interface. Requests and parameters received by the host state machine are converted by to host state machine to events and parameters for the processing by the various state machines.

The control state machines include power, sleep, trap, and event state machines. The control state machines are for coordinating the activities of all of the various operation state machines. For example the power state machine dictates, at a high level, the distribution of power to all of the state machines. The power state machine also controls the relative priorities of the state machines. The sleep state machine controls the removal of power from the state machines, and the trap and event state machines are used to generate and process internal hardware and software events for coordinating state machine activities.

The timing state machines, clock and timer, maintain count registers that are used by the state machines to synchronize time dependent activities and to generate time-out signals.

The manufacturing state machines, receive, transmit, and test are used during the assembly of the disk drive for formatting and verifying the operational integrity of the disk drive.

The engineering state machines receive, send, and test, in cooperation with the manufacturing state machines are used for testing and debugging the functional features of the software and hardware of the disk drive, at the state machine level, during a design phase.

Each of the state machines includes, by way of example, the following steady states in order of increasing levels of power consumption: an initial reset state having a lowest level of power consumption, medial sleep, idle, and ready states, and a busy state having a highest level of power consumption. Some of the state machines may have additional steady states such as stop, wait, and standby.

Each state machine also includes transitional states during which power is generally increased when the state machine transitions to a steady state of higher power consumption, for example initialize and power-up. Transitional states during which power is generally decreasing include, for example power-down and sleep.

Each of these states, standby or transitional, for each of the state machines, is optimized to increase performance of the subsystem while at the same time reducing the power requirements making employment of methods and apparatus embodying the invention particularly useful in portable computer applications having internal power supplies of limited capacity.

BRIEF DESCRIPTION OF THE DRAWINGS

FIG. 5B is a block diagram of the state machines embodying the invention;

FIG. 5C is state diagram of a state machine embodying the invention;

FIG. 6 is a block diagram of state machine registers;

FIG. 9 is a state diagram of the disk state machine shown in FIG. 5B;

FIG. 10 is a state diagram of the servo state machine shown in FIG. 5B;

DETAILED DESCRIPTION OF AN EMBODIMENT OF THE INVENTION

Figure 1:
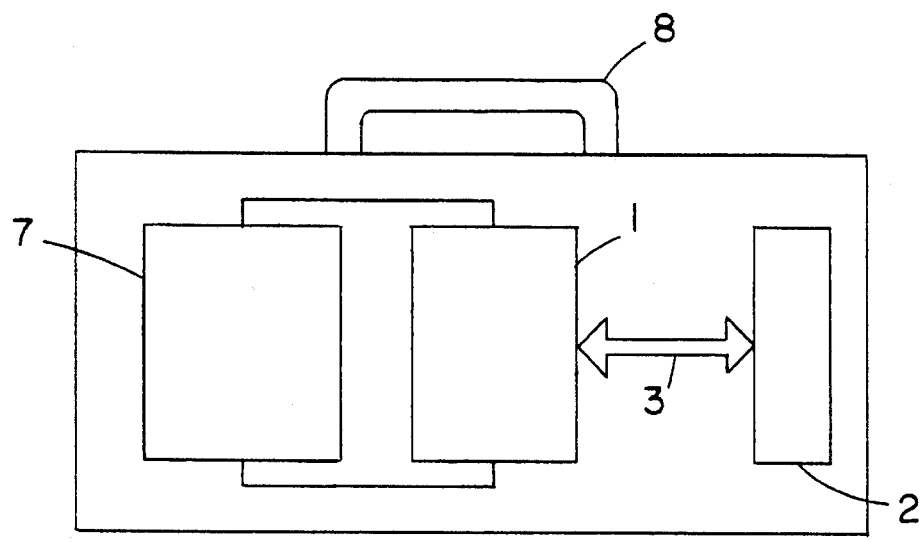
FIG. 1 is a block diagram of a computer system that can use the present invention.

FIG. 1 is a block diagram of a generally conventional computer system 5 that can use an apparatus and method according to the present invention. The computer 5 includes a host computer system (host) 1 (having a central processing unit or CPU, primary volatile storage, and the like, not shown) coupled to a secondary permanent storage device, such as a disk drive 2, by a system bus 3. During operation, the host 1 transfers information to and from the disk drive 2 by placing transfer requests on the system bus 3.

For the purpose of illustrating an embodiment of the present invention, the computer 5 is assumed to be of the type that is portable, for example a laptop. Therefore, the computer 5 is further provided with a handle 8, and an internally contained power source, for example batteries 7, to provide portability. Now, it is well-known that portable computers are capable of rapidly draining the power from the batteries 7, making the computer 5 unfit for its intended purposes.

To conserve power, conventional portable computers generally run at reduced speed, and hence reduced performance. In order to improve performance, the computer 5 is sometimes equipped with autonomously operating subsystems, such as the disk drive 2 provided with programmable control in the form of microprocessors and associated structures such as memory and bus interfaces.

Figure 2:
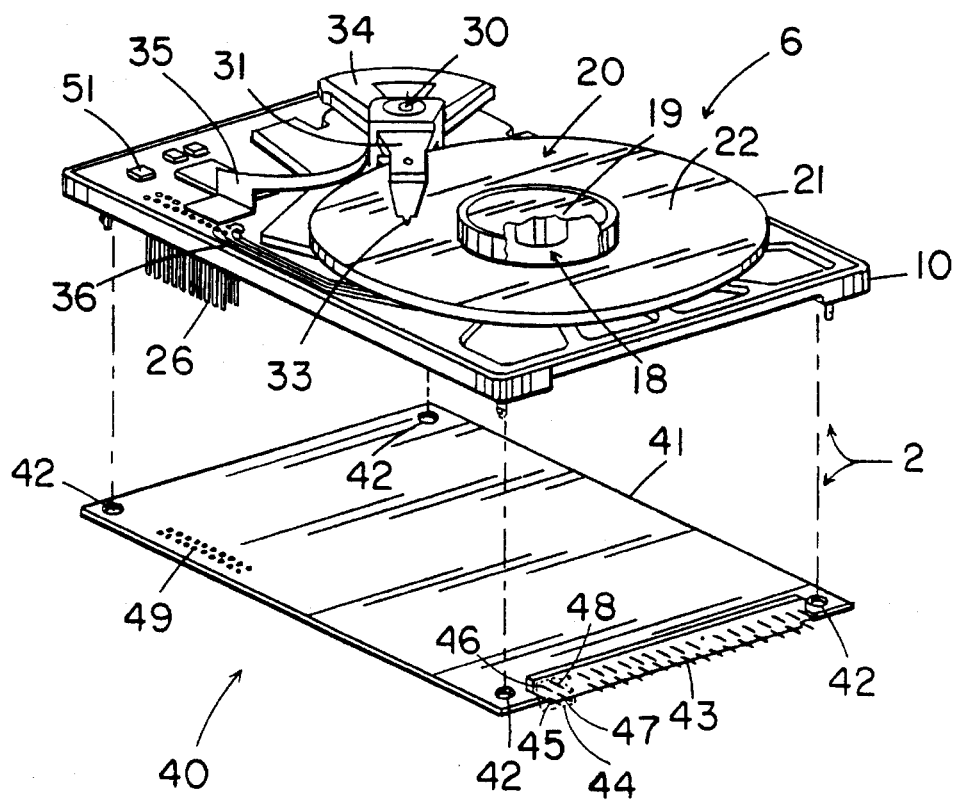
FIG. 2 is an exploded perspective view of a disk drive subsystem of the computer system of FIG. 1.

Again, for the purpose of illustrating an embodiment of the invention, FIG. 2 shows an input/output (I/O) subsystem including a reduced size disk drive 2. The drive 2 includes a head and disk assembly (HDA) 6 and controller 40.

The HDA 6 comprises a base 10 on which are mounted a disk assembly 20 and a head assembly 30. The disk assembly 20 includes a rotatably mounted spindle 19 and at least one disk 21 mounted thereon. The spindle 19 includes a conventional brushless DC motor mounted inside the spindle shaft, its position generally indicated by lead 18, for rotating the spindle 19.

The disk 21 is, for example, a 2 1/2 inch form factor disk, having a recording surface 22 for storing information. The head assembly 30 includes a pivotally mounted actuator arm 31 having a voice-coil 34 at one end thereof. A read/write head 33 is mounted at the other end of the actuator arm 31 for reading and writing information on the disk surface 22. The disk drive 2 may include multiple disks, and each disk having a read/write head 33 for each surface. The base 10 also includes etched circuit traces, generally indicated by numeral 36, for connecting to the various electrical components mounted on the base 10.

Mounted on the base 10 near the head assembly 30 is a preamplifier 51 for amplifying the read/write signals to and from the head 33. A resilient flexure circuit or flexure 35 connects circuits of the read/write head 31 and voice-coil 34 with the circuit traces 36 of the base 10. The flexure 35 is resilient and incorporates a small bend to provide a small mechanical force onto the actuator arm 31 tending to urge the arm 31 radially inwards.

Extending from the bottom of the base 10 are pins 26 for connecting the electrical components of the HDA 6 (preamplifier 51, spindle motor 18, voice-coil 34, and read/write head 33) with the circuits of the controller 40 via the circuit traces 36.

The controller 40 comprises a printed circuit board (PCB) 41, approximately the same size as the base 10, having electronic components and circuits, not shown, mounted thereon. The components and circuits will be described in detail with reference to FIG. 3. The PCB 41 is provided with, for example, four throughholes 42 for mounting the PCB 41 to the base 10 with conventional fastener means, such as screws or snap tabs. The HDA 6 and the controller 40 are electrically coupled to each other by pins 26 on the HDA 6 and plug 49 on the controller 40. An I/O connector 43 is mounted on one edge of the PCB 41 for electrically connecting the circuits of the controller 40 via the bus 3 to the host 1 of FIG. 1. The I/O interface between the host 1 and the drive 2 is defined in accordance with, for example, an industry standard such as IDE/AT or SCSI.

Four of the pins of the I/O connector 43, indicated by numerals 45–48 (designated as vendor specific by the IDE/AT standard) are defined as, for example, a serial port 44. The four pins of the serial port 44 are configured, by way of example, as follows. Pin 45 is a control pin having a high signal when the drive 1 is configured as a subsystem to host 1, and communicating via the bus 3 in accordance with IDE/AT or SCSI standards. Pin 45 has a low signal when enabled for testing the disk drive 2 by a testing device via the pins 45–48 of the serial port 44. Pin 47 is used for a power signal, for example, +12 V to operate the disk drive 2 in test mode. Pins 46 and 48 are for serially receiving and transmitting test characters when the disk drive 2 is configured in test mode.

Figure 3:
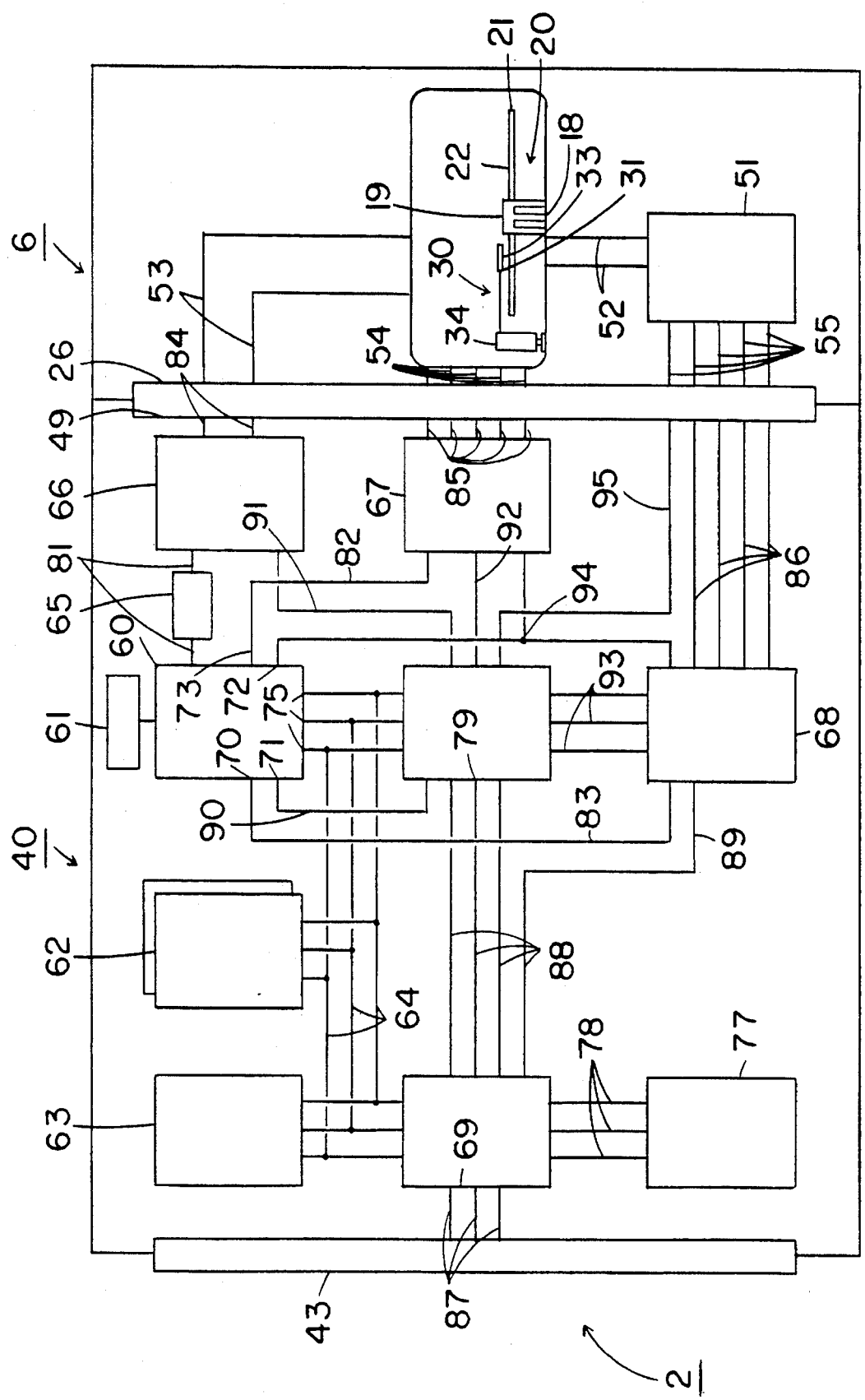
FIG. 3 is functional schematic block diagram of the disk drive of FIG. 3.

FIG. 3 is a functional block schematic diagram of the disk drive 2 comprising the HDA 6 and the controller 40. The HDA 6 includes the disk assembly 20 and the head assembly 30. Also shown is the preamplifier 51 for amplifying the read/write signals of the read/write head 33. The preamplifier 51 is, for example a SSI 32R4010. Lines 52 connect the preamplifier 51 to the read/write head 33. Lines 53, 54 and 55 connect the voice-coil 34 of the head assembly 30, the spindle motor 18, and the preamplifier 51 to the controller 40, respectively, via the pins 26 and the plug 49.

The controller 40 includes a microprocessor 60 and a crystal clock generator 61. The microprocessor 60 is, for example, a Siemens S80C166 driven at 40 Mhz by the clock 61. The microprocessor 60 is of the type that is operable at varying power levels, for example reset, sleep, idle, and active, drawing nominally 0, 2, 100, and 1200 mwatts respectively. Other microprocessors that have similar characteristics include the Motorola 68HC16 and the Intel 80C190. The microprocessor 60 operates at a plurality of interrupt priority levels. At any one time, the microprocessor 60 is operating at a particular priority level, and only interrupts of a higher priority level will suspend current operations. Interrupts of a lower priority level are held pending until the priority level of the microprocessor 60 is sufficiently lowered. The microprocessor 60 includes a conventional instruction pointer for pointing at a memory location storing a next instruction to be executed.

The microprocessor 60 includes an A/D interface 70, a clock interface 71, a serial interface 72, and a timer interface 73. The microprocessor 60 also includes an internal bus interface 75 connected to address, data, and control lines 64.

The controller 40 also includes a static random access memory (SRAM) 62 and a flash programmable read only memory (FPROM) 63. The FPROM 63 is used for long term data and program (microprocessor 60 instructions) storage. The SRAM 62 is loaded from the FPROM 63 when the controller 40 is made operational. The FPROM 63 has, for example, 128 K× 8 bit bytes of storage with a 150 ns cycle time. The SRAM has, for example, 32 K×8 bit bytes of storage with a 85 ns cycle time. The microprocessor 60, FPROM 63, and SRAM 62 are connected to each other by address, data, and control lines 64.

The microprocessor 60 is coupled to an actuator driver chip 66 by line 81, a spindle driver chip 67 by line 82, and a read/write driver chip 68 by lines 83 and 94. These chips 66–69 are also of the type which are operable at different power levels. The signals from the microprocessor 60 to actuator driver 66 pass through a low-pass filter 65. The actuator driver chip 66 controls the positioning of the head assembly 30 by varying the currents in the voice-coil 34. The actuator driver chip 66, for example an Allegro 8932, is connected to plug 49 by lines 84.

The spindle driver chip 67, for example an Allegro 8902, is connected to the timer interface 73 of the microprocessor 60. The spindle driver chip 67 controls the rotational velocity of the spindle 19 by varying the currents in the spindle motor 18. The spindle driver chip 67 is connected to plug 49 by lines 85, and to the timer interface 73 of the microprocessor 60 by line 82, and to the serial interface 72 of the microprocessor by line 94.

The read/write driver chip 68, for example an AT&T Reach 2 provides signal currents for the read/write head 33. The read/write driver chip 68 performs A/D–D/A conversions, pulse shaping, and signal encoding/decoding for the read/write signals. The read/write driver chip 68 is connected to plug 49 by lines 86. The read/write head 33, the preamplifier 51, the read/write driver chip 68, and lines 52 and 86 are collectively known as the read/write channel. When read/write currents are present in any of these components, the read/write channel is said to be "on," otherwise the read/write channel is said to be "off."

Two types of information are commonly transferred over the read/write channel. The first type is information transferred between the host 1 and the disk drive 2 in direct response to applications initiated by the user of the computer system 5, sometimes know as "user data." The second type of information is timing, positional, and address information, sometimes known as "servo data," usually prerecorded on the disk 21 during manufacture. The following generally conventional terminology will be used with respect to the description of the prerecorded servo data.

Figure 4:
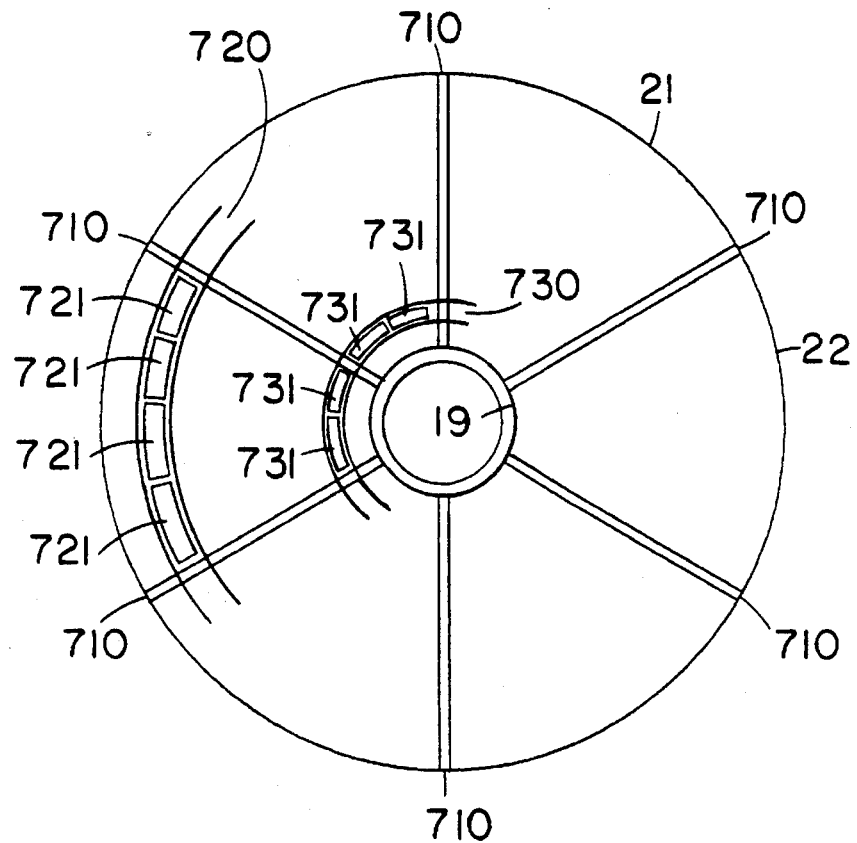
FIG. 4 is a top planar view of a the disk of FIG. 3.

FIG. 4 shows one surface 22 of the disk 21. During the manufacture of the disk 21, it is generally the practice to record a plurality of radial timing spokes 710 on the surface 22, the timing spokes 710 being recognizable by having a unique signal pattern. For example, the disk 21 as described herein, has forty such spokes 710. However for clarity of the FIG. 4, only a small number of the timing spokes 710 are shown. One of the spokes 710, designated as an index spoke, generally contains a signal pattern different from the other spokes. The index spoke is used to synchronize the beginning of each disk 21 revolution.

Also shown are two of a plurality of recording tracks, tracks 720 and 730 having sectors 721 and 731 formatted therein, respectively. Formatting is the term that is conventionally used to describe the process of writing skeletal sector information on the disk 21, including address information, preambles, and post-ambles to allow subsequent read and write operations to uniquely identify a particular sector, and determine exactly the appropriate place for user data. Once a disk has been formatted the relative positions of the sectors remains fixed until the disk is subsequently reformatted.

The circumferential lengths of tracks near the outer edge of the disk 21, such as track 720, are greater than the circumferential lengths of tracks near the spindle 19, such as track 730. For this reason, and in order to maximize storage capacities, the number of sectors per track may be varied according to their relative radial positions, outer tracks having a greater number of sectors per track than inner tracks. This variable allocation of sectors to tracks is known as "banding." A band is a group of tracks with the same number of sectors. The disk 21 described herein has, for example, 1149 tracks distributed over 4 bands.

Also, in order to maximize the number of sectors in a particular track, sectors are sometimes allowed to straddle timing spokes 710, as shown for track 730. Therefore, timing signals are used to differentiate servo data from user data during information transfers over the read/write channel, taking into consideration timing spokes 710, banding.

Again with reference to FIG. 3, the controller 40 also includes a bus driver chip 69 also of the type operable at varying power levels, for example an IDE/AT Cirrus Logic SH360, for interfacing the circuits of the controller 40 with the host 1 over bus 3 of FIG. 1. The bus driver chip 69 is connected to the I/O connector 43 by lines 87. The bus driver chip 69 may also be, for example, a SCSI bus driver chip. The bus driver chip 69 is connected to a buffer memory 77, for example having 32 K×8 bit bytes of random access memory, by address, data, and control lines 78. The buffer memory 77 is used to buffer data transferred between the host 1 and the disk drive 2 because of their different data transfer rates. The bus driver chip 69 is connected to the read/write driver chip 68 by line 89. The bus driver chip 69 is also connected to lines 64 for communicating data with memories 62 and 63 and microprocessor 60.

All of the controller components are interfaced with each other by means of a servo and logic timer (SALT) chip 79 in the form of an application specific integrated circuit (ASIC). The purpose of the SALT chip 79 is to ensure that the functions performed by the actuator, spindle, and read/write driver chips, 66, 65, and 68 respectively, are performed in a cooperation sequence and do not interfere with each other. The SALT chip 79 is connected to the microprocessor 60 by lines 64, to the clock interface 71 by line 90, to the actuator driver chip 66 by line 91, to the spindle driver chip 67 by lines 92, to the actuator driver chip by lines 93, and to the pre-amplifier 51 by line 95.

For example, prior to stopping the rotation of the spindle 19 (sometimes known as spinning down, and performed by the spindle driver chip 67), it may be required that any data transfers in progress (performed by the read/write driver chip 68) are completed, and that the actuator arm 31 is unloaded (performed by the actuator driver chip 66.) Similarly, another example of a cooperation function performed by the SALT chip 79 is to ensure that the read/write signals are sampled by the read/write driver chip 68 precisely at the right moment when the disk 21 is correctly positioned underneath the head 33.

During operation of the HDA 6, in response to requests communicated to the controller 40 by the host 1, the disk 21 is rotated at a high velocity, for example 3600 rpm or higher. While operating, the rotational velocity of the disk 20 is monitored by sampling, for example, the back EMF (electromotive force) currents from the spindle motor 18 to generate tachometer pulses. The spindle driver chip 67 under control of the microprocessor 61 maintains the correct spindle speed in response to the tachometer pulses generated by the spindle motor 18 back EMF.

Also, in response to host 1 initiated requests, the head 33 is radially positioned relative to the various concentric data recording tracks on the recording surfaces 22 of the disk 2 by the actuator driver chip 66 under control of the microprocessor 61, in combination with the servo data of the read/write channel, sometimes collectively known as the "servo mechanism." With respect to the servo mechanism, the following generally conventional terms will be used to describe various actuator arm positions and positioning actions discussed further below.

When a disk drive 2 is turned off, the actuator arm 31 is generally maintained in a "home" position. In a home position, depending on the particular drive, the read/write head 33 of the arm 31 is either completely off the disk 21, or rests on a portion of the disk 21 not used for information storage. This attitude of the arm 31 and head 33 is commonly referred to as "retracted," "unloaded," or "parked."

After the disk 21 has been spun up to operating speed, the read/write head 33 is "loaded," that is, the head 33 flies above the disk surface 22. Then, as a next step, the actuator arm 31 is positioned to a known predetermined reference track; this is referred to as "return-to-zero."

Once the head 33 is positioned above a known track, the term "detenting" is used to describe the action of keeping the head 33 aligned with the center line of the track. Detenting is done by using the read/write head 33 to sample servo data and address information, usually prerecorded on the disk 21 at time of manufacture. The term "seeking" generally means the process of moving the head 33 and arm 31 from the current track to another track.

If the disk drive 2 has a problem in reading information stored on the disk 21 it may go into a "calibrate" mode to compensate for deviations in the gain in the signal from the head 33 and deviation in the bias voltage of actuator arm 31. As a last resort, diagnostic functions may be performed to recover normally unreadable information by off setting the head 33 from either side of the center line of the track in small increments to compensate for drift in the signals of the servo system over time.

Continuing now with the description of the operation of the controller of FIG. 3, requests initiated by the host 1 cause transfers between the disk 2 and the host 1 by the read/write driver chip 68 over the read/write channel, also under control of the microprocessor 60.

It is a well known characteristic of I/O subsystems, as explained above, that they generally operate sporadically. That is, from a perspective of the internal workings of the subsystem, for example controller 40 executing instructions at nanosecond speeds or faster, requests generated by the host 1 appear infrequently, sometimes seconds apart, but more frequently minutes apart. Even seemingly frequent incidents, such as the tachometer pulses generated from the back EMF currents of the spindle motor 18, during the rotation of the disk 21, only require the attention of the controller 40 about every 16.7 milliseconds for the disk 21 spinning at 3600 rpm. In other words, the electrical components of the disk drive 2, for example the voice-coil 34, spindle 19, and read/write head 33 and their associated driver chips 66–68, spend a disproportionate amount of time idly waiting for a request to process, merely consuming power.

By implementing the subsystem as a collection of event driven software state machines, according to the present invention, the sporadic operation of the I/O subsystem is exploited to reduce the power requirement of the disk drive 2, thereby extending the life of the batteries 7.

As previously stated, a state machine is a mathematical model suitable for representing the structure and operation of a device such as a computer system or a subsystem thereof. The state machine transitions from state to state in response to stimulation by events.

Figure 5A:
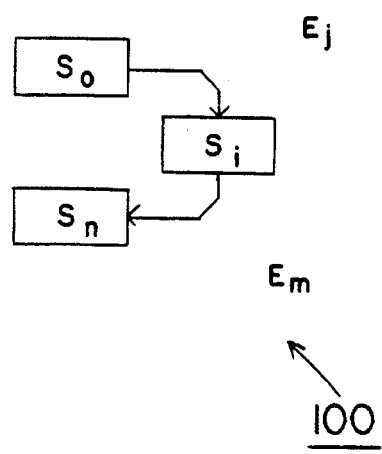
FIG. 5A is a state diagram of a conventional state machine.

FIG. 5A shows, by way of an example, a conventional state diagram in a general manner as will be used herein to describe the invention. A state machine (SM) 100 has three states $S_0$, $S_i$, and $S_n$. State so is an initial state of the machine, state $S_i$ is some intermediate state, and state $S_n$ is some final state of the machine. The SM 100 responds to events $e_j$ and $e_m$. Event $e_j$ causes SM 100 to transition from state $S_0$ to state $S_i$, and event $e_m$ causes SM 100 to transition from state $S_i$ to state $S_n$. The output generated during each transition of the machine, either a or r, is not shown. Events are either software or hardware induced.

Each new event (one from the set $E=\{d_0, \ldots, e_m\}$) as a function of the current state (one of the set $E=\{S_0, \ldots, S_n\}$) of the machine determines the next state according to the function being performed (F: S×E=s'). In addition, each state has an output indicative of the manner in which the event was processed, (Q: S×E=a or r). During operation, each state machine starts from an initial state $S_0$. Events from the set E are applied to a state machine in a timed sequence. Each event transitions a state machine to a next state s.

As will be discussed in detail herein, the I/O controller 40 is implemented as a collection of event driven software state machines. Each state machine (SM) is uniquely identifiable and includes a predetermined set S of unique states $\{S_0, \ldots, S_n\}$ each state being responsive to a predetermined set E of unique events $\{e_0, \ldots, e_m\}$ which cause a state machine to transition from one state to another. Each state machine is responsible for managing a particular function of the disk drive 2 including the physical and electrical components necessary to perform the function.

FIG. 5B shows the state machines used to implement a power reduced subsystem, embodying the present invention. The state machines include operation, control, timing, manufacturing, and engineering state machines.

The operation state machines will be described first. The operation state machines are responsible for directly controlling the operation hardware and software components used for transferring data between the host 1 and the disk drive 2 over the system bus 3. Operation state machines include the host state machine HstSM 300, the drive state machine DrvSM 400, the disk state machine DskSM 430, the servo state machine SrvSM 450, the spindle state machine SpnSM 470, and the sector state machine SctSM 490.

Next the control state machine will be described. The control state machines coordinate and control the activities of all of the state machines. Control state machines include the power state machine PwrSM 500, the sleep state machine SlpSM 530, the trap state machine TrpSM 540, and the event state machine EvnSM 550.

This will be followed by the description of the two timing state machines. The timer state machine TmrSM 560 and the clock state machine ClkSM 570 are used by the various state machines to control time dependent functions and provide time-out event signals.

Then the manufacturing state machines are described, including the receive RcvSM 580, the transmit state machine SndSM 600, and the test state machine TstSM 610. These three state machines permit the disk drive 2 to be fully operated and exercised during manufacturing, without the presence of the host 1. These state machines are also used to format and verify the operational integrity of the disk drive 2, and to load the FPROM 63 of FIG. making the drive 2 software configurable for compatibility with any number of interfacing standards or disk geometries.

The last three state machines, the break state machine BrkSM 630, the trace state machine TrcSM 650, and the opcode state machine OpcSM 670, in cooperation with the manufacturing state machines are for debugging and testing the state machines during a design phase.

Before the specific descriptions of the state machines for the disk drive of one embodiment of the invention, the general structure and operation of the event driven software state machines, in an implementation of the present invention will be introduced with reference to FIG. 5C.

FIG. 5C shows a state diagram for an event driven example software state machine (ExpSM) 200. It should be understood, and as will be described herein, that each of the state machines used to implement the reduced power disk drive 2 subsystem as shown in FIG. 3, according to the invention, may have fewer or more states and events than the ExpSM 200, and that the exact states and events may not exactly correspond to the example ExpSM 200. The state machine shown, ExpSM 200 will suffice to illustrate some of the principles of the invention.

The ExpSM 200 comprises states ExpRst (Reset) 201, ExpSlp (Sleep) 202, ExpIdl (Idle) 203, and ExpRdy (Ready) 204. These states 201–204, are defined as steady states. Steady states will be shown as squared boxes.

In addition, the ExpSM 200 also comprises states ExpIni (Initialize) 205, ExpPup (Power-up) 206, ExpPdn (Power-down) 207, ExpCls (Close) 208, ExpOpn (Open) 209, and ExpBsy (Busy) 210. These states 205–210 are defined as transitional states. Transitional states will be shown as rounded boxes.

When a state machine is in a transitional state, the components of the disk drive 2 are actively being manipulated, and at least one additional, and generally predeterminable event is anticipated within a relatively short time to cause the machine to transition to another state (either steady or transitional). In other words, transitional states are generally active and temporary intermediate states, and are primarily responsive to internally generated anticipated events.

When a state machine is in a steady state it is generally inactive and may be in that steady state for an indeterminable length of time, and the event which will cause a transition from a steady state to a transitional state can generally not be anticipated. That is, when a state machine is operating in a steady state it is primarily responsive to externally generated unanticipated events. Upon entry into a steady state a state machine broadcasts an event to all other state machines to indicate that the machine 200 has entered a particular steady state.

The state diagram of FIG. 5C also shows events ExpIniE (initialize) 221, ExpPupE (power-up) 222, ExpIdlE (idle) 223, ExpClsE (close) 224, ExpOpnE (open) 225, ExpPdnE (power-down) 226, ExpSlp (sleep) 227, ExpRdy (ready) 228, ExpDoE (do) 229, and ExpDonE (done) 230. Events are shown by directed arrows.

Events can either be software or hardware generated and usually have associated predetermined input parameters. Software events are generated by the software of the state machines executing a microprocessor 60 instruction which causes a hardware interrupt. Software events can also be generated by the software of the state machine executing a microprocessor 60 instruction to cause a subroutine call. One type of software event is a time-delayed event. A time-delayed event is not released to a destination state until after the expiration of a predetermined length of time. Time-delayed events are used to ensure that state machines are re-activated in case of hardware failure or long periods of inactivity.

Hardware events are generated by the components of the disk drive 2 and include interrupts generated in response to the disk drive 2 completing a particular operation or needing attention. An event driven software state machine has the capability of inducing or generating subsequent events, either for itself or other state machines to cause further state transitions.

Traditional state machines are generally either data or clock driven, or some combination thereof. In data driven state machines, the state machines continuously monitor the source of events for the occurrence of a next event in order to transition the state machine to a next state. In clock driven state machines, the machines generally transition to next states in time with periodic clock pulses. Machines of either ilk are generally wasteful of processor power or less efficient, or both. The event driven software state machines as described herein only transition to a next state upon direct provocation by an event. In fact it is the very occurrence of the event itself that initiates a state transition.

FIG. 6 shows indicators or registers expressive of a state machine. These indicators include a state status register (SSR) 250 and a corresponding state address register (SAR) 254. The SSR 250 includes, for example a first byte 251 for storing a state number SN, a second byte 252 for storing a time value TM, and a third byte EC 253 for storing an error code EC. The SN 251 indicates the current state of the machine, the TM value 252 is to maintain a timing value for an event. The EC code 253 is generally indicative of a particular error condition which may occur in processing an event.

The SAR 254 contains the address of the next function to be performed by the state machine when an event occurs. The address is, for example, a memory location in SRAM 62 of a sequence of computer instructions to be executed by the microprocessor 60 when the next event for the state machine occurs.

Each state machine also has a predetermined state machine priority level (SPL). The SPL is used to arbitrate the processing of competing time dependent events. For example, when the read/write head 33 is positioned above a particular location relative to the disk surface 22 spinning at a high speed, only a limited amount of time is available to initiate the data transfer before the surface 22 flies by. Therefore the state machine which manages user and servo data transfers over the read/write channel (SctSM 490) is assigned a relatively high priority.

Events related to communicating with the host can be processed in a more relaxed fashion, and therefore HstSM 300 is assigned a relatively low priority. The state machine which is responsible for maintaining the speed of the spindle 19 (SpnSM 450) is assigned, for example, an intermediate priority. State machines having a higher SPL process events ahead of state machines having a lower SPL, even if it means interrupting a state machine already in progress of processing a lower priority event.

The basic processing of hardware and software and hardware events is now described. First the processing of hardware events. The microprocessor 60 includes a generally conventional interrupt control table (ICT). The ICT includes table entries (sometimes called vectors) for each of the possible interrupts (or hardware events) of the microprocessor 60. Interrupts or hardware events are generated by the hardware components, or by software executing specific instructions of the microprocessor 60, or by the microprocessor itself. Each ICT entry or vector consists of an address and a priority level. There is an entry in the ICT for each of the state machines of FIG. 5B. The address in an entry or vector of the ICT is the address of a state machine interrupt service routine for processing the interrupt or hardware event. In other words, the ICT entry for an event identifies a particular state machine to process the event.

The interrupt service routine is a sequence of instructions of a state machine stored in SRAM 62. There is one service routine for each state machine. The priority level in an entry of the ICT corresponds to the preassigned SPL of the associated state machine.

The hardware events for a particular state machine are processed through the interrupt service routine of the respective state machines. Therefore, a hardware events will vector through the ICT to the appropriate interrupt service routine of the identified state machine to process the event.

At any one time, one of the state machines is executing an instruction. The state machine is presumed to be executing an instruction even if the instruction is an idle or sleep instruction suspending further execution of instructions. Hardware events interrupt the execution of instructions by the microprocessor 60 if the priority level (SPL) for state machine identified in the ICT entry for the event, as indicated in the second word of the entry for the interrupt (event) in the ICT, is higher than the priority level of the state machine executing instructions in the microprocessor 60.

That is, in response to the event, execution is immediately transferred to the appropriate service routine of the identified state machine. Otherwise the event is held pending until the priority level of the microprocessor 60 is sufficiently lowered.

The interrupt service routine for a state machine, in response to the event first performs context switching. That is, the current context of the microprocessor 60, such as the contents of the various general purpose registers of the microprocessor 60, is preserved for subsequent restoration after processing the hardware event. A new context is established for state machine which is to process the event. Since each event is directly associated with a particular state machine, simply loading the instruction pointer of the microprocessor 60 with the SRAM 62 address stored in the SAR 224 will transfer control to a sequence of instructions to process the event. Software events are simply generated by a subroutine call to the sequence of instructions to process the event. In either case, the processing of the event begins within a small number of microprocessor 60 machine cycles after the event is generated, making the event driven state machine extremely responsive and efficient.

With this in mind, and understanding that the specific state machines, as will be disclosed further to describe one embodiment of the invention may have distinct states and events peculiar to their operation, the operation of the ExpSM 200 at the state level will now be described. The functions performed in each state of ExpSM 200 are described for exemplary purposes.

It should also be kept in mind, in the examination of the state diagrams, those machine states near the top of the diagram are generally states of a lower activity, with fewer electrical components turned on, and therefore, in accordance with the invention, lower power consumption. And conversely, machine states near the bottom of a state diagram represent states of a higher activity, with more components turned on, therefore a corresponding higher level of power consumption.

The transitional states are generally responsible for either increasing or decreasing the level of power used by the components controlled by a state machine. In addition, during any state, steady or transitional, power may be further reduced, for example the microprocessor 60 can be placed in its idle mode, if the state needs to wait for some event to be generated before it can proceed. Also during any state, if a subsequent event is not received within a predetermined length of time, the state machine will transition to a state having a lower level of power consumption.

Any of the state machines, such as the one in shown in FIG. 5C, is always presumed to be in an initial (so) or reset state ExpRst 201 when power is first applied to the machine. A hardware reset causes the power state machine PwrSM 500 to generate an initialize event, for example ExpIniE 221, for each of the state machines needing to be initialized. The event ExpIniE 221 causes the ExpSM 200 transition to the initialize state ExpIni 205.

The state ExpIni 205 is transitional. During this state, for each of the state machines, various state machine specific parameters and tables are initialized. For example, driver chips 66–69 are loaded with default values, timing registers and disk geometries are established. In summary, during the initialization, a state machine is conditioned to begin operation. Now, during the initialization period, a state machine may need to synchronize itself with other state machines to eliminate race conditions. In other words, a particular state machine in this transitional state may not transition to a next state until other state machines have also been initialized. If waits are required, during the initialization state the state machine will place the microprocessor 61 in the idle mode to conserve power.

A power-up event (ExpPupE) 222 generated during the state ExpIni 205 generally signals the completion of the initialization process and causes the transition from the state ExpIni 205 to the power-up state ExpPup 206.

During the power-up state ExpPup 206 the various state machines first apply power to their respective components, and interrupts are generally enabled. Any state machines that control hardware components, for example driver chips 66, 67, and 68, will also start those devices running by enabling their clocks. Again, as for the initialize ExpIni 205, a state machine may place the microprocessor 60 in the idle mode while waiting for components to get up to full power condition.

An idle event (ExpIdlE) 223 generated during the state ExpPup 206 will cause the state machine to transition from the state ExpPup 206 to the idle state ExpIdl 203. In the idle state all hardware, software and memory components necessary for the operation of the state machine have been initialized and the state machine is essentially available to respond to events. In the idle state ExpIdl 203 the state machine also is capable of processing hardware generated events. In any case, when in an idle state, a state machine, unless responding to an event, will place the microprocessor 60 in idle mode to conserve power.

When the state machine ExpSM 200 is in the idle state ExpIdl 203, an event can take the state machine to a state requiring either more or less power. For example, a power-down event ExpPdnE 226 puts the state machine in a sleep mode ExpSlp 202 via the transitional power-down state ExpPdn 207 and a subsequent sleep event ExpSipE 227. During the state ExpPdn 207 power is withdrawn from those electrical components which no longer require power. Additionally, as previously stated, in the absence of events to process, the state machine will transition to a state having a lowest level of power consumption.

An open event ExpOpnE 225 will transition the state machine ExpSM 200 to the open state ExpOpn 209. The open event (ExpOpnE), as an example, is typically generated in response to a host 1 initiate request. For example, if a state machine is capable of performing a function for a number of different resources, perhaps other hosts, multiple processes in a host, or other state machines, and the function to be performed includes several consecutive steps that need to be completed without the intervention of competing resources, the requesting resource can establish exclusive ownership over one or several state machines with, for example, an open event. An open event may also cause additional electrical components to be activated to bring them closer to a state of readiness.

As an example, a host 1 request to transfer (read or write) a block of information, generally involves the sequential steps of seeking to a track, waiting for the disk 20 to rotate into position under the read/write head 33, and transferring information. Obviously, while the information is being transferred, other state machines must be prevented from, for example, wrenching the actuator arm 33 out of position before completion of the information transfer.

A ready event ExpRdyE 228 transitions the state machine ExpSM 200 from the open state ExpOpn 209 to the ready state ExpRdy 204. When the machine is in the ready state, a close event ExpClsE 231 will take the machine through the transitional state ExpCls 208 and event ExpIdlE 223 back to idle state ExpIdl 203. In other words, a close event releases state machine resources and makes the state machine available for other pending requests.

From the state ExpRdy 205, operational functions can generally be performed. For example, a do event ExpDoE 229 (do something), will take the machine out of the ready state ExpRdy 205, into the transitional busy state ExpBsy 210 until the operation has been completed, signaled by the done event ExpDonE 230. This event will transition the machine back to the ready state ExpRdy 205. Even while a machine is "busy" doing something, the microprocessor 60 can be placed in idle mode to conserve power. For example, any operations which may involve a wait for a hardware interrupt may meanwhile conserve power by placing the microprocessor 60 in the idle mode.

Now with reference to FIGS. 7–24, the various state machines used to implement one embodiment of an event driven, reduced power subsystem, according an embodiment of the invention, will be described.

Figures 7, 8:
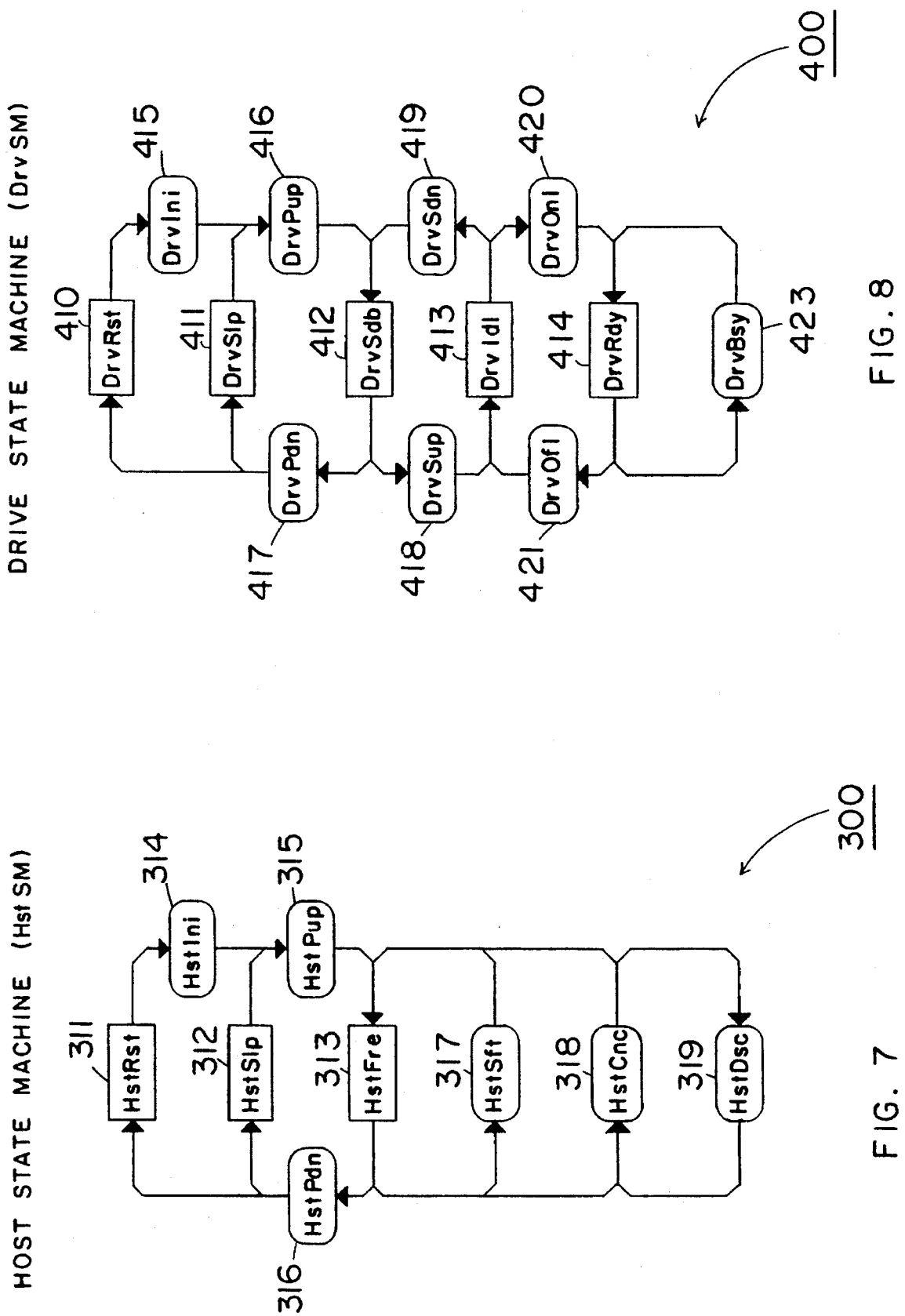
FIG. 7 is a state diagram of the host state machine shown in FIG. 5B.
FIG. 8 is a state diagram of the drive state machine shown in FIG. 5B.

FIG. 7 shows the state diagram for the host state machine HstSM 300. HstSM 300 includes the steady states HstRst (reset) 311, HstSlp (sleep) 312, and HstFre (free) 313, and the transitional states HstIni (initialize) 314, HstPup (power-up) 315, HstPdn (power-down) 316, HstSft (soft-reset) 317, HstCnc (connect) 318, and HstDsc (disconnect) 319.

The host state machine HstSM 300 is the top level state machine which controls the interaction between the host 1 and the disk drive 2 over the bus 3 by interacting with the bus driver chip 69. HstSM 300 provides the means for converting, for example IDE/AT or SCSI compatible requests from the host 1 to software events for the state machines. HstSM converts host 1 requests, including parameters specifying, for example track, head, sector, and number of sectors, into disk drive 2 events such as read and write, and event parameters such as a logical block number and the number of logical blocks to be transferred.

During the reset and initialization states HstIni 314, the bus driver chip 69 is, for example, enabled and loaded with constants and status values. During HstIni 314 a power-up event is generated to transition HstSM 300 through HstPup 315 to HstFre 313. HstPup 315 completes the power-up sequence of HstSM 300. For example, the buffer manager for buffer memory 77 is enabled. At the completion of power-up HstSM 300 transitions to HstFre 313.

The free state HstFre 313 is the normal operational state for HstSM 300. That is, HstFre 313 is the state from which events are normally processed after initialization and power-up. After processing of such events, the host state machine HstSM 300 transitions back to HstFre 311. The operational events which control the bus interface and which are processed from HstFre 313 include soft-reset, connect, and disconnect. These events transition HstSM 300 through HstSft 317, HstCnc 318, and HstDsc 319, respectively. During HstSft 317, the bus driver chip 69 is reinitialized without removing power.

During the connect state HstCnc 318, HstSM 300 logically connects the disk drive 2 to the host 1 in anticipation of requests from the host 1 for the disk drive 2. The generally conventional IDE/AT host 1 initiated requests that are processed by HstSM 300 while it is connected include: recalibrate disk, read, write, or verify single sector, format a track, seek to a cylinder, execute drive diagnostics, initialize drive characteristics, set multiple sector mode, read or write multiple sectors, set power mode, identify drive, read or write buffer, and set drive features. Some of these requests, particularly the ones related to data transfers, may include additional conventional input parameters, such as head number, drive number, cylinder number, sector number, and number of sectors.

These host 1 requests and associated parameters are converted from external standards (i.e. IDE/AT) to an internal format for disk drive 2, and cause the generation of events with appropriate logical parameters. The generation of the events will generally invoke other state machines to complete the processing of the host 1 requests.

The details of specific physical drive functions performed as a result of processing a host request will be discussed in context of the associated state machines. During the processing of a particular host request, HstSM 309 returns to the state HstFre 313 if multiple physical drive actions are required. At the completion of processing a host request the disk drive 2 is logically disconnected from the bus 3 in the transitional state HstDsc 319.

When HstSM 300 is in the free state HstFre 313, HstSM 300 will transition through HstPdn 316 to HstSlp 312 if a power-down event is received. HstSM 300 will also transition to HstSlp 312 if a subsequent event is not received within a predetermined length of time, for example 5 seconds. During HstPdn 316 the disk drive 2 is powered down by generating power-down software events for the other state machines, and then the bus driver chip 69 is put in sleep mode to conserve power by the state machine executing a software instruction which activates the sleep mode of the microprocessor 60.

FIG. 8 shows the state diagram for the drive state machine DrvSM 400. DrvSM 400 is the top level state machine which controls the physical drive 2 and which processes software events generated by HstSM 300. DrvSM 400 includes the steady states DrvRst (reset) 410, DrvSlp (sleep) 411, DrvSdb (stand-by) 412, DrvIdl (idle) 413, and DrvRdy (ready) 414, and the transitional states DrvIni (initialize) 415, DrvPup (power-up) 416, DrvPdn (power-down) 417, DrvSup (spin-up) 418, DrvSdn (spin-down) 419, DrvOnl (on-line) 420, DrvOfi (off-line) 421, and DrvRdy (ready) 423.

The drive state machine DrvSM 400 handles all events which control or perform disk drive 2 operations. DrvSM 400 converts "logical" events and parameters generated by HstSM 300, into "physical" events and parameters for the state machines which directly control the components of the disk drive 2. DrvSM 400 also controls read and write buffers of buffer memory 77 used during data transfers with host 1.

During the state DrvIni 415 all hardware and software components, including other state machines, necessary to process events related to the physical operation of the disk drive 2 are initialized. During the power-up state DrvPup 416, a drive spin-up event and a drive on-line event are generated to cause the drive to transition sequentially through the states DrvSdb 412, DrvSup 418, DrvIdl 413, and DrvOnl 420 to the ready state DrvRdy 414, as will be explained further.

If DrvSM 400 is in the standby state DrvSdb 412 and either a power-down event or a subsequent event is not received within a predetermined length of time, which normally would not be the case if DrvSM 400 transitions to DrvSdb 412 from DrvPup 416, DrvSM 400 will exit the standby state DrvSdb 412 and transition through DrvPdn 417 to the drive sleep state DrySlp 411 to conserve power. During DrvPdn 417 and the driver chips 66–69 are put in sleep mode to conserve power. In the sleep state DrvSlp 411, the microprocessor 60 itself is also put in sleep mode.

If there is a pending spin-up event, DrvSM 400 will transition from DrvSdb 412 through DrySup 418 to DrvIdl 413. In the spin-up state DrvSup 418 the disk 21 is spun up to speed by DrvSM 400 generating a spin-up event for the spindle state machine SpnSM 470. Once the disk 21 is up to speed DrvSM 400 transitions to the idle state DrvIdl 413.

When DrvSNI 400 is in the idle state DrvIdl 413 and either a spin-down event is received, or a subsequent event is not received within a predetermined length of time, which normally would not be the case if DrvSM 400 transitions to DrvIdl 413 from DryPup 416 and DrvSup 418, DrvSM 400 will exit the idle state DrvIdl 413 and transition through DrvSdn 419 to DrvSdb 412.

If DrvSM 400 transitions to the idle state DrvIdl 413 from the power-up state DrvPup 416, the pending on-line event generated by DrvPup 416 will immediately transition DrvSM 400 through the drive on-line state DrvOnl 420 to the ready state DrvRdy 414. During DrvOnl 420 the actuator arm 31 is loaded by DrvOnl 420 generating a return-to-zero event for the servo state machine SrvSM 450. After the head is loaded and positioned above a known track, a ready event will transition DrvSM 400 to the steady state DrvRdy 414. The ready state DrvRdy 414 is generally the normal state from which operational drive events are performed.

If DrvSM 400 is in the ready state DrvRdy 414 and either an off-line event is received, or a subsequent event is not received within a predetermined length of time, which normally would not be the case if there are pending operational events, DrvSM 400 transitions through DrvOfi 421 to DrvIdl 413. In DrvOfi 421 a retract event is generated for the servo state machine SrvSM 470 to unload the actuator arm 31. When the actuator arm 31 is in a retracted (home) position the servo mechanism can be shut down to conserve power.

If there are events pending, the drive state machine DrvSM 400 will transition to the busy state DrvBsy 423, until the event is processed. Processing the event generally includes the steps of: converting the HstSM 300 logical parameters to a physical disk format, generating appropriate events and physical parameters for the disk state machine DskSM 430, and opening a time-delayed event, waiting for completion of the physical operation, checking correct completion, and generating a ready event to transition DrvSM 400 back to DrvRdy 414 so that the next event may be processed.

FIG. 9 shows the state diagram of the disk state machine DskSM 430 which includes the steady states DskRst (reset) 431, DskSlp (sleep) 432, and DskOff (off) 433, and the transitional states DskIni (initialize) 434, DskPup (power-up) 435, DskPdn (power-down) 436, DskRds (read-sector) 437, DskWrs (write-sector) 438, DskRdl (read-long) 439, DskWrl (write-long) 440, and DskFmt (format) 441. The disk state machine DskSM 430 is generally responsible for managing the state machines which directly control the physical components of the disk drive 2.

During the initialize state DskIni 434 the disk hardware and software components are initialized. That is, the read/write driver chip 66, and parts of the bus driver chip 69 are loaded with the parameters that define, for example, the disk geometry and the logical block to physical sector mapping. Normally, after initialization DskSM 430 will transition immediately through DskPup 435 to DskOff 433.

During DskPup 435 the disk 21 is spun up to speed (by SpnSM 470, and the actuator arm 31 is loaded by SrvSM 450 and the read/write channel is partially turned on to permit track following. During operation of disk drive 2, the normal state for DskSM 430 is the steady off state DskOff 433.

From DskOff 433 the disk state machine generally transitions through states 437–441 to effect an information data transfer. Otherwise, if no events are received within a predetermined length of time, the disk drive 2 is put to sleep to conserve power by transitioning through the power-down state DskPdn 436 to the sleep state DskSlp 432.

The transitional states DskRds 437, DskWrs 438, DskRdl 439, DskW-440 and DskFmt 441 are used to perform substantially conventional data transfer functions. The functions are in respective order: read a sector, write a sector, read a sector in long mode, that is including the sector pre- and post-amble, write sector long, and format a sector.

FIG. 10 shows the state diagram for the servo state machine SrvSM 450 which includes the steady states SrvRst (reset) 451, SrvSlp (sleep) 452, SrvHom (home) 453, and SrvDtn (detent) 454, and the transitional states SrvIni (initialize) 455, SrvPup (power-up) 456, SrvPdn (power-down) 457, SrvRtz (return-to-zero) 458, SrvRtr (retract) 459, SrvSek (seek) 460, SrvRcl (recalibrate) 461, and SrvDgn (diagnose) 462.

The servo state machine SrvSM 450 is responsible for loading and unloading the read/write head 33 and positioning the head 33 radially above the various concentric tracks of the recording surface 22 of the disk 21. It does so by interacting with the actuator driver chip 66 and servo data received from the read/write channel.

During the initialization state SrvIni 455, the actuator driver chip 66 is loaded with various parameters that control the radial movement of the actuator arm 31, such as the relative positions of the concentric tracks of the disk 21, the velocity parameters which determine how fast the arm 31 is moved, and the servo sampling rate used to sense the current position of the actuator arm 31 as it is moved from track to track. As a last step SrvIni 455 generates a power-up event to transition SrvSM 450 to the power-up state SrvPup 456.

During SrvPup 456 the voice coil 34 and the read/write channel are partially activated to enable servo data sampling prior to loading the head 31 onto the disk 21. Then a home event generated at the completion of power-up transitions SrvSM 450 to the home state SrvHom 453.

When in the home state SrvHom 453, SrvSM 450 can transition to either SrvSlp 452, or SrvDtn 454. If no additional events are received within a predetermined time when SrvSM 450 is in SrvHom 454, a power-down is generated, and SrvSM 450 transitions through SrvPdn 457 to SrvSlp 452. The state SrvRtz 458 is used to position the read/write head 31 above a known reference track.

As was previously described with reference to FIG. 3, he read/write head 33 and the voice-coil 34 are connected to the circuits traces 36 on the base 10 by the flexure 35. The design of the flexure 35 provides a small bias force tending to urge the actuator arm 31 radially inward to a position substantially above the tracks of the disk 21 when the actuator arm 31 is not locked in a home position.

Therefore as an advantage of this embodiment of the invention, in order to conserve power, only a very small voltage is applied to the voice-coil 34 to start the movement of the actuator arm 31 to a neutral bias position. A neutral bias position being the position of the actuator 31 where a minimal voltage is required to hold the arm 31 in position. Once the arm 31 is in a neutral bias position, that is, minimal voltage on the voice-coil 34, a detent event is generated to start the servo mechanism detenting to the nearest track.

The detent state SrvDtn 454 is the normal state from which actuator arm 31 positioning events are processed. During SrvDtn 454 the servo data sampled through the read/write channel are used to keep the head 33 centered on track, initially the reference track, but subsequently the various tracks as the actuator arm 31 seeks other tracks. That is, as the disk 21 is rotated, any variations of the center line from track to track is compensated for by SrvDtn 454 making minute adjustments to the actuator arm 31 by varying the voltage to the voice-coil 34. While in SrvDtn 454, a retract, seek, recalibrate, or diagnostic event will transition SrvSM 450 to another state.

If no events are received within a predetermined length of time, SrvSM 450 transitions from SrvDtn 454 through the retract state SrvRtr 459 to the home state SrvHom 453. SrvRtr 459 moves the actuator arm 31 to its home position and the read/write channel is turned off to conserve power since servo data sampling is no longer required. Note that from SrvHom 453, SrvSM 450 subsequently transitions to the sleep state SrvSlp 452 during periods of inactivity, further reducing power consumption by, for example, spinning down the disk 21.

A seek event will transition SrvSM 450 from SrvDtn 454 through SrvSek 460 back to SrvDtn 454. During SrvSek 460, the actuator arm 31 is positioned either radially inwardly or outwardly to a new track. During the positioning of the arm 31, SrvSek 460 varies the voltages to the voice-coil 34 to optimally accelerate and deaccelerate the arm 31 to minimize the positioning time, depending on the distance that the arm 31 needs to travel. Once on track SrvSek 460 generates a detent event to transition SrvSM 450 to SrvDtn 454.

The recalibrate state SrvRcl 461 is used to perform conventional servo recalibration functions such as measuring the read/write head 33 gain, the voice-coil 34 bias force and electrically compensating for unanticipated variations: A detent event is generated at the completion of the recalibration function to return SrvSM 450 back to SrvDtn 454.

The diagnostic state SrvDgn 462, responsive to an event generated as result of an error condition, is used if there is a problem with reading recorded information. During SrvDgn 462, diagnostic information is collected from the servo mechanism, and if an uncorrectable error is found, SrvSM 450 is transitioned through the return-to-zero state SrvRtz 458 to put the actuator arm 31 in its home position. Otherwise, during SrvDgn 462, an attempt is made to recover information by positioning the head 33 from the center line of the track by small incremental off-sets in either direction of the center line of the track by increasing and decreasing the bias voltage of the voice-coil 34.

Figure 11:
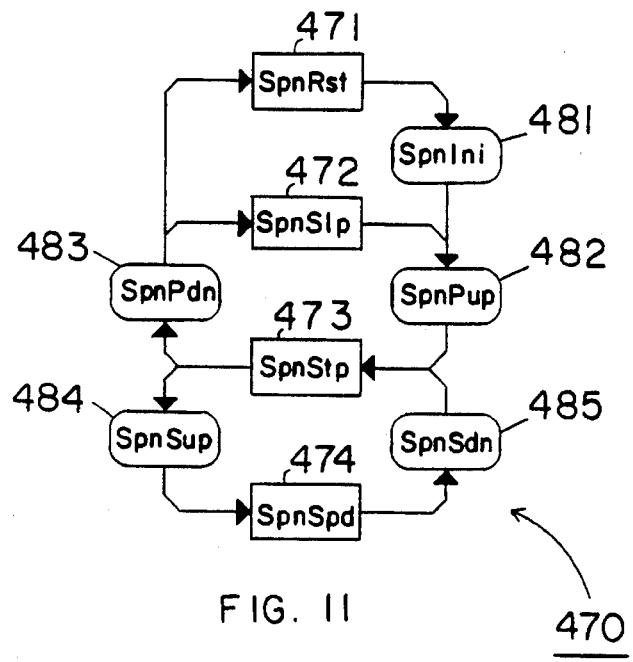
FIG. 11 is a state diagram of the spindle state machine shown in FIG. 5B.

FIG. 11 shows the state diagram for the spindle state machine SpnSM 470 which includes the steady states SpnRst (reset) 471, SpnSlp (sleep) 472, SpnStp (stop) 473, and SpnSpd (at-speed) 474, and the transitional states SpnIni (initialize) 481, SpnPup (power-up) 482, SpnPdn (power-down) 483, SpnSup (spin-up) 484, and SpnSdn (spin-down) 485.

The spindle state machine SpnSM 470 is responsible for maintaining the correct rotational speed of the spindle 19. It does so by interacting with the spindle driver chip 67. After power-up the spindle 19 is still stopped while in the state SpnStp 473. During the transitional state SpnSup 484, the spindle 19 is spun up to speed, at which time the spindle state machine SpnSM 470 transitions to the steady at-speed state SpnSpd 474.

While in SpnSM 470, interrupts generated by the tachometer pulses during the rotation of the disk 21 are used to adjust the speed of the spindle 19 by varying the voltage to the spindle motor 18. If the rotational speed of the spindle 19 is reduced to conserve power, the state SpnSdn 485 ensures that the actuator arm 31 is at a home position, that is retracted, before the spindle 19 is spun down, otherwise SpnSdn 485 generates a retract event for the servo state machine SrvSM 450.

Figure 12:
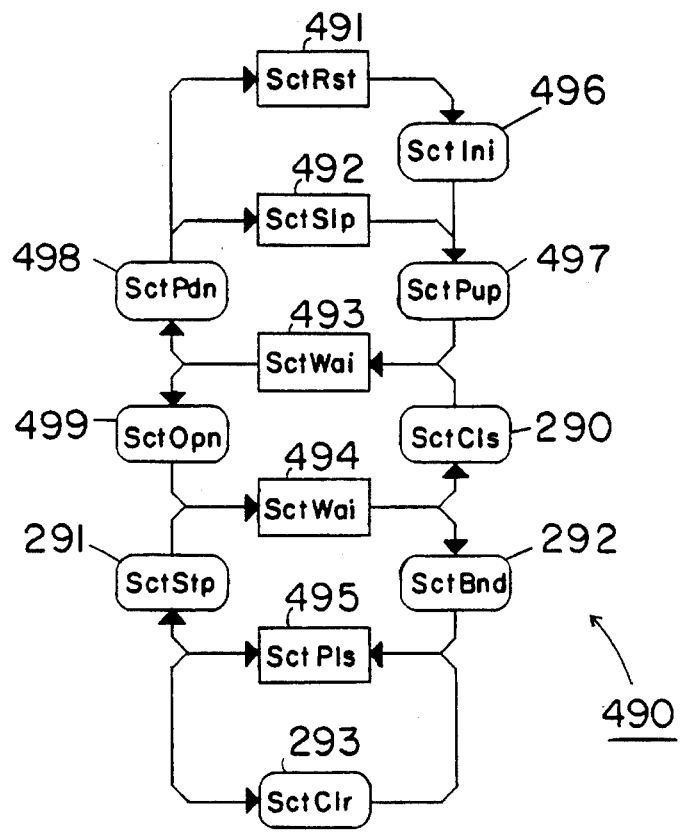
FIG. 12 is a state diagram of the sector state machine shown in FIG. 5B.

FIG. 12 shows the state diagram for the sector state machine SctSM 490 which includes the steady states SctRst (reset) 491, SctSlp (sleep) 492, SctIdl (idle) 493, SctWai (wait) 494, and SctPls (pulse) 495, and the transitional states SctIni (initialize) 496, SctPup (power-up) 497, SctPdn (power-down) 498, SctOpn (open) 499, SctCls (close) 290, SctStp (stop) 291, SctBnd (band) 292, and SctClr (clear) 293.

SctSM 490 synchronizes read and write operations in conjunction with the SALT chip 79 and the read/write driver chip 68 by monitoring for spokes 710 and generating sector and spoke pulses. After initialization (SctIni 494) and power-up (SctPup 495), SctSM 490 is in the idle state SctIdl 493. The states SctOpn 499 and SctCls 290 are used to open and close a spoke watchdog process which monitors for the occurrence of spokes 710 from the servo data on the read/write channel during the rotation of the disk 21. The generation of sector and spoke pulses is started during SctBnd 292. That is, the band state sets up the appropriate frequency of the sector and spoke pulses depending on the current band. Pulsing is stopped during the stop state SctStp 291. After pulsing has been enabled, sector and spoke pulses indicating a next sector or spoke approaching the read/write head 33 are generated during the pulse state SctPls 495 by timed software events. These pulses are used to distinguish user and servo data on the read/write channel. Note that the microprocessor 60 is placed in idle mode by the state executing an idle instruction of the microprocessor 60 even between servo and spoke pulses to improve power consumption. Any errors due to missing pulses are cleared during SctClr 293. Note that the pulses that are generated during SctPls 495 are resynchronized as necessary by the spoke watch-dog process started during SctOpn 499.

The change state SctChg 498 is used to change the rate of sector pulses if the actuator arm 31 is to be positioned to tracks in a different band. If the disk is not spinning, or the head 33 is retracted SctSM 490 is put to sleep to conserve power.

In addition to the state machines described above, which have primary responsibility for transferring data between the host 1 and the disk drive 2, the disk drive 2 also includes four control state machines which coordinate events between the various operation state machines.

Figure 13:
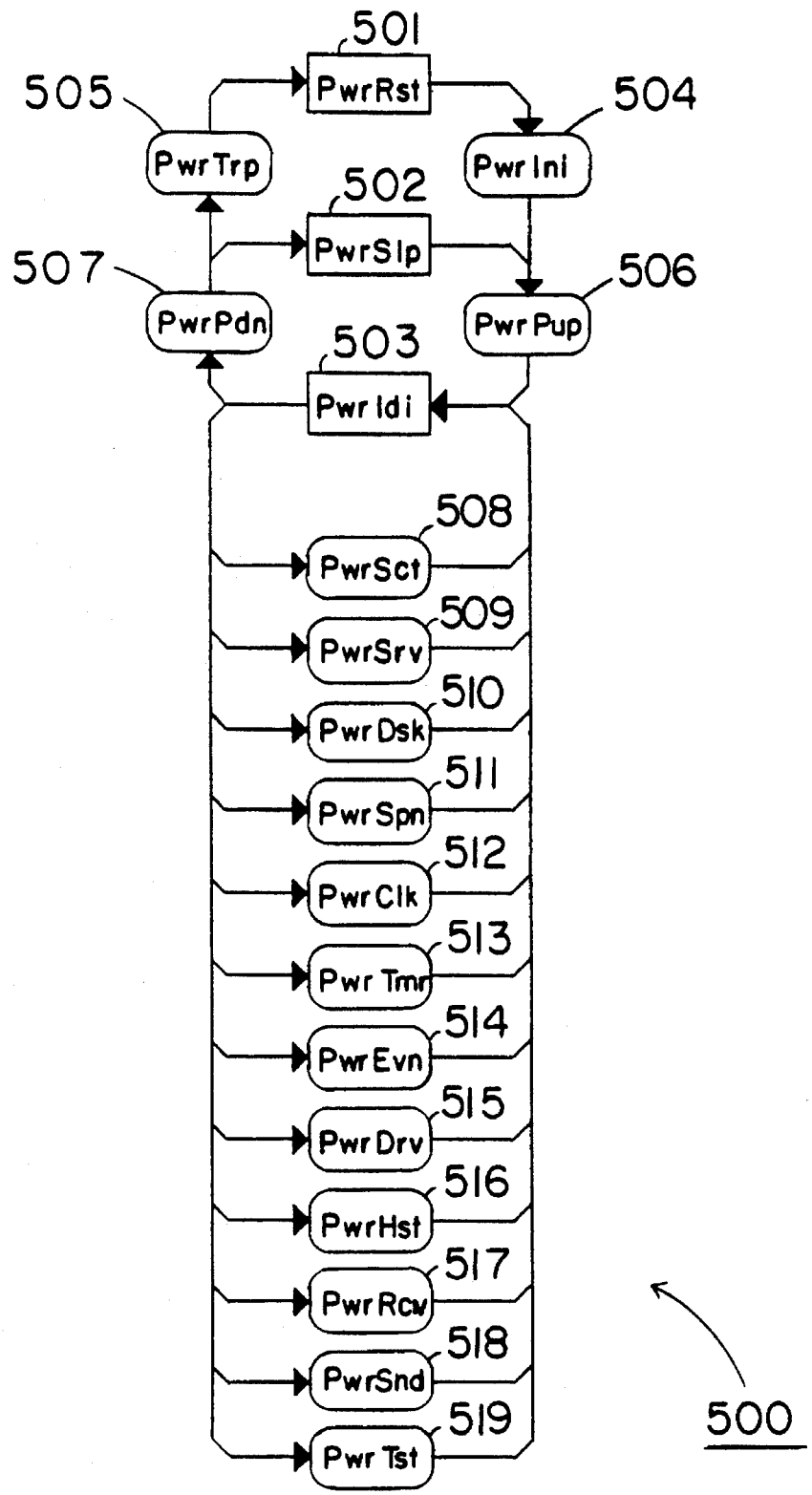
FIG. 13 is a state diagram of the power state machine shown in FIG. 5B.

FIG. 13 shows the state diagram for the power state machine PwrSM 500 which includes the steady state PwrRst (reset) 501, PwrSlp (sleep) 502, and PwrIdl (idle) 503. PwrSM 500 also includes the transitional states PwrIni (initialize) 504, PwrTrp (trap) 505, PwrPup (power-up) 506, and PwrSlp (sleep) 507. The transitional states PwrSct (sector) 508, PwrSrv (servo) 509, PwrDsk (disk) 510, PwrSpn (spindle) 511, PwrClk (clock) 512, PwrTmr (timer) 513), PwrEvn (event) 514, PwrDrv (drive) 515, PwrHst (host) 516, PwrRcv (receive) 517, PwrSnd (send) 518, and PwrTst (test) 519.

The power state machine PwrSM 500 is in effect the state machine that activates the operation of the disk drive 2 upon power-up. A hardware reset signal, generated when power is first applied to the microprocessor 60, is the event which cause PwrSM 500 to begin execution. During the initialization state PwrIni 504, the SRAM 62 is loaded from the FPROM 63, and the driver chips 66–69 are initialized, that is the chips 66–69 are loaded with run-time parameters. During PwrIni 504, initialize events are also generated for all of the other state machines, so that they are initialized in priority order. The priority order is shown in FIG. 13 top to bottom for states 508–519. The state machine with the highest priority (SctSM 490) is initialized first during PwrSct 508. The state machine with the lowest priority (TstSM 610) is initialized last during PwrTst 519.

Figure 14:
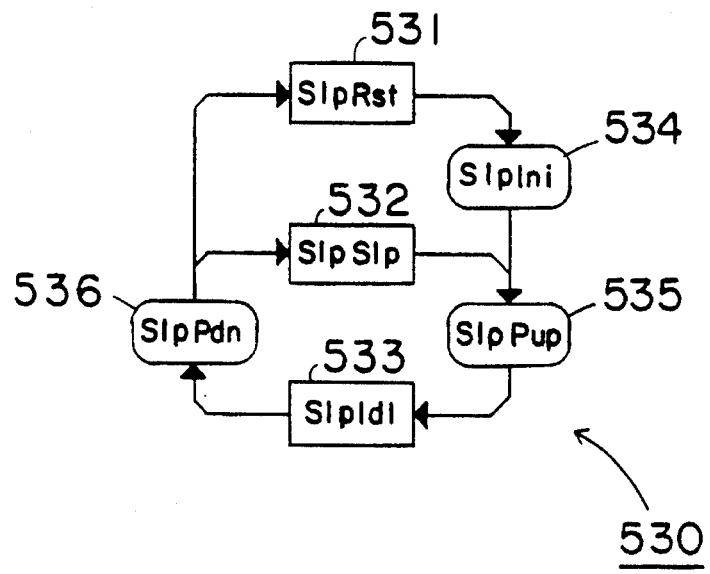
FIG. 14 is a state diagram of the sleep state machine shown in FIG. 5B.

FIG. 14 shows the state diagram for the sleep state machine SIpSM 530 which includes the steady states SlpRst (reset) 531, SipSip (sleep) 532, and SlpIdl (idle) 533, and the transitional states SlpIni (initialize) 534), SipPup (power-up) 535, and SlpPdn (power-down) 536.

The sleep state machine SIpSM 530 is responsible for putting the drive 2 to sleep, that is putting all state machines in their lowest possible rate of power consumption. This is done by SlpSm 530 executing an instruction which causes the microprocessor 60 to enter sleep mode. During the sleep state SlpPdn 536, power is removed from the driver chips 66–69, and a power-down instruction is executed to put the microprocessor 60 in sleep mode.

Figure 15:
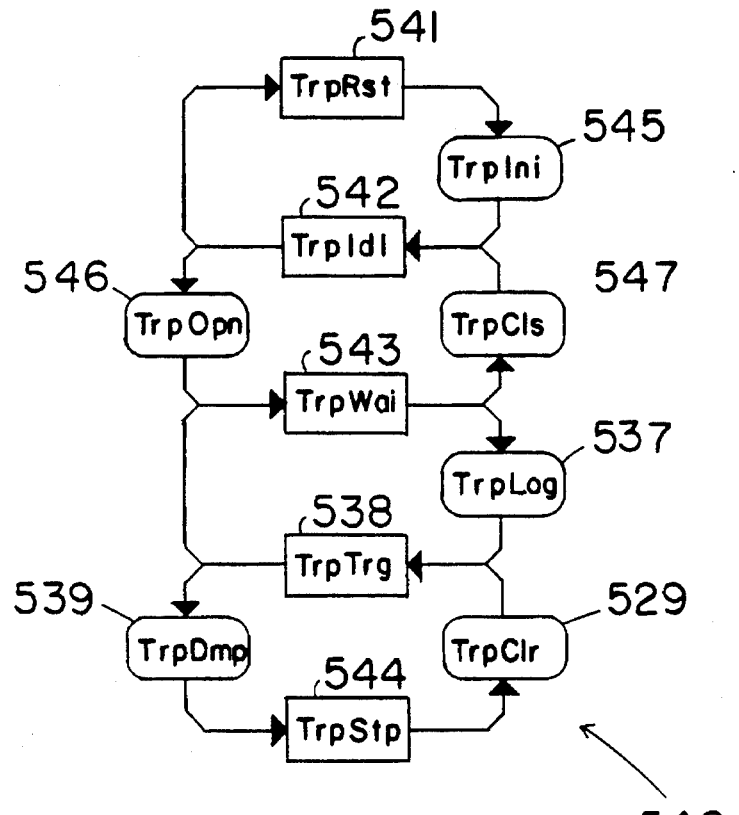
FIG. 15 is a state diagram of the trap state machine shown in FIG. 5B.

FIG. 15 shows the state diagram for the trap state machine TrpSM 540 which includes the steady states TrpRst (reset) 541, TrpIdl (idle) 542, TrpWai (wait) 543, TrpStp (stop) 544, and the transitional states TrpIni (initialize) 545, TrpOpn (open) 546, TrpCls (close) 547, TrpLog (log) 537, TrpTrg (trigger) 538, TrpDmp (dump) 539, and TrpClr (clear) 529.

The trap state machine TrpSM 540 is responsible for managing events generally indicative of some unrecoverable microprocessor 60 error. Examples of unrecoverable hardware errors include executing an illegal machine instruction code, a protected instruction fault, or an attempt to illegally access a word operand, instruction, or external bus. Each of these types of errors has an associated error code.

During initialization, memory space for a trap buffer for logging trap errors is allocated in SRAM 62 by TrpIni 545. After initialization, TrpSM 540 is usually in the idle state TrpIdl 542. The logging of trap errors is enabled with an open event, which causes TrpSM 540 to transition through TrpOpn 546 to TrpWai 543. Logging of trap errors is disabled during the close state TrpCls 547. After logging has been enabled, TrpSM 540 is usually in the wait state TrpWai 543. When a trap event is generated due to some unrecoverable hardware error, the error code, CPU status and general purpose registers, as well as state machine status registers (SSR 250) are logged in the trap buffer. The error code is also compared with the trigger values stored in memory during TrpTrg 538. Logging of the error causes TrpSM 540 to transition through TrpTrg 538 to trigger the dumping of the trap buffer to the host during the transitional state TrpDmp 539. After dumping the trap buffer further processing is stopped during TrpStp 544 until the error is cleared. Then TrpSM 540 transitions through TrpTrg 538 to TrpWai 543.

Figure 16:
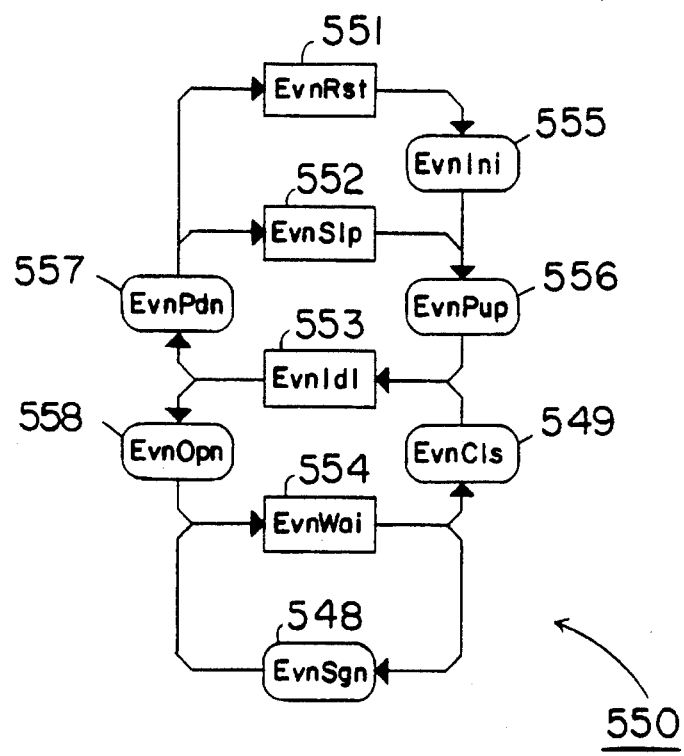
FIG. 16 is a state diagram of the event state machine shown in FIG. 5B.

FIG. 16 shows the state diagram for the event state machine EvnSM 550 which includes the steady states EvnRst (reset) 551, EvnSlp (sleep) 552, EvnIdl (idle) 553, and EvnWai (wait) 554. Also shown are the transitional states EvnIni (initialize) 555, EvnPup (power-up) 556, EvnPdn (power-down) 557, EvnOpn (open) 558, EvnCls (close) 549, and EvnSgn (signal) 548.

The event state machine is responsible for controlling the software events of the disk drive 2. During operation EvnSM 550 maintains an event table in SRAM 62 for pending events, and signals the various state machines of pending events by generating appropriate hardware interrupts. Memory space for the event table is allocated in SRAM 62 during the initialize state. Events are established in the event table during the open state EvnOpn 558, and removed during the close state EvnCls 549. If no events are pending EvnSM 550 is the idle state EvnIdl 553.

Each event stored in the event table includes an identification of a source and a destination state machine, and two timing values, namely an event timer and an event clock. The event timer is used for timing short periods in the range of about 0.0000004 to 0.01 seconds, for example spoke pulse. The event clock is used for timing events having longer durations in the range of about 0.01 to 600 seconds for maintaining, for example, a time-of-day clock for the disk drive 2.

The timing values are initialized at the time an event is established in the event table to, for example, a negative integer value. Subsequently, as long as the event remains pending, the timing values are periodically incremented, in accordance with the appropriate timing rate. Should a timing value expire before the event is handled by overflowing to, for example, a positive integer, EvnSM 550 will signal the destination state machine responsible for handling the software event by generating an interrupt or hardware event in the signal state EvnSgn 548.

Figure 17:
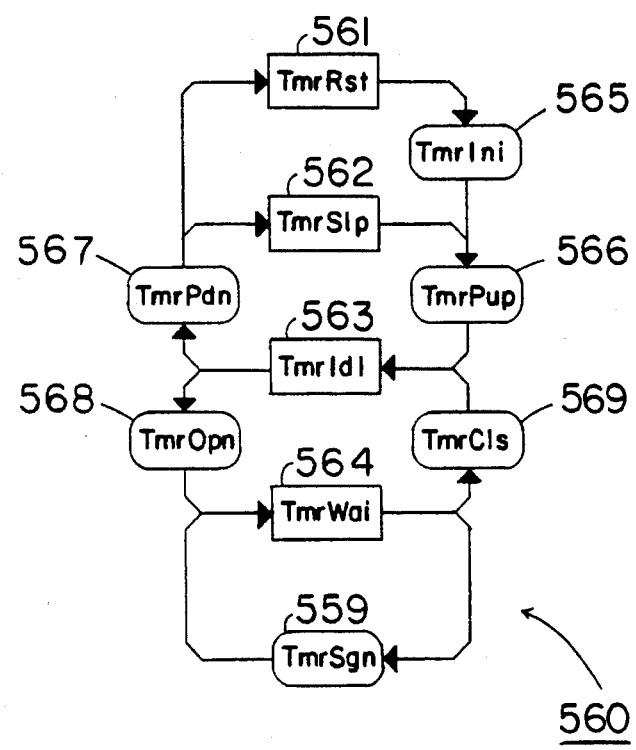
FIG. 17 is a state diagram of the timer state machine shown in FIG. 5B.

FIG. 17 shows the state diagram for the timer state machine TmrSM 560 which includes the steady states TmrRst (reset) 561, TmrSlp (sleep) 562, TmrIdl (idle) 563, and TmrWai (wait) 564. Also shown are the transitional states TmrIni (initialize) 565, TmrPup (power-up) 566, TmrPdn (power-down) 567, TmrOpn (open) 568, TmrCls 569, TmrSgn (signal) 559.

The timer state machine TmrSM 560 is responsible for managing time-delayed events. Time-delayed events are generated by state machines to time: processing actions, event delays, and periods of inactivity. For example, spinning down the disk 21 may take several seconds. Therefore, the state which is responsible for this task may generate a time-delayed event and then go to a reduced power mode by putting the microprocessor 60 in idle mode, while waiting for this activity to complete. If any of the hardware components fail to signal the completion of an activity, the expiration of the time-delay will trigger the reactivation of the state $S_0$ that the exception condition can be processed.

Similarly, the various steady states generate time-delayed events when waiting for the next events before placing the microprocessor 60 in idle mode. If a subsequent event is not received within a predetermined length of time, the state machine can transition itself to a state of lower power consumption.

During initialization memory space for a timer table is allocated in SRAM 62. After initialization and power-up the normal state for TmrSM 560 is the idle state 563. Upon receiving an open event to open or create a time-delayed event, TmrSM 560 transitions through TmrOpn 568 to the wait state TmrWai 564. During TmrOpn 568 the time-delayed event is established in the timer table in SRAM 62. Time-delayed events may be in the range of about 0.01 to 26.2 milliseconds.

During the wait state, TmrSM 560 monitors for expiration of time for the time-delayed events maintained in the timer table. Any time-delayed events which do expire are released by TmrSgn 559. Time-delayed events are removed from the timer table by TmrCls 569.

Figure 18:
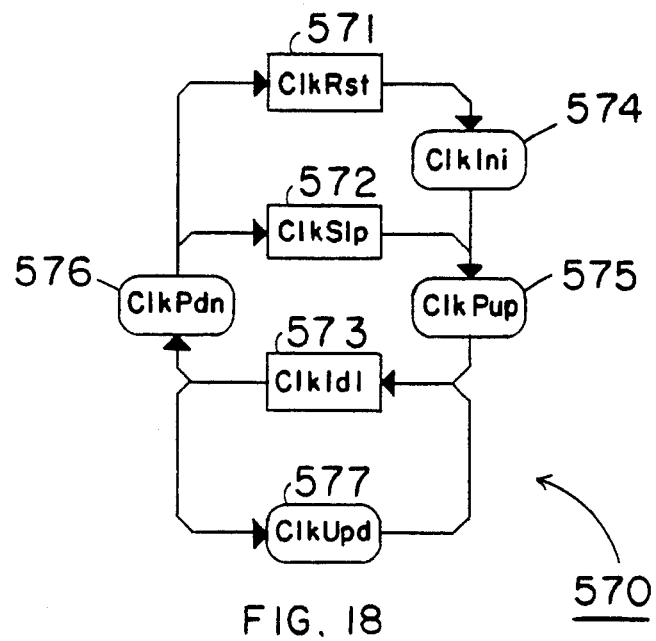
FIG. 18 is a state diagram of the clock state machine shown in FIG. 5B.

FIG. 18 shows state diagram for the clock state machine

ClkSM 570 which includes the steady states ClkRst (reset) 571, ClkSlp (sleep) 572, and ClkIdl (idle) 573. Also shown are the transitional states ClkIni (initialize) 574, ClkPup (power-up) 575, ClkPdn (power-down) 576, and ClkUpd (update) 577.

The clock state machine ClkSM 570 is responsible for updating the timing counts of the time-delayed events maintained in the timer table of the timer state machine TmrSM 560. After initialization and power-up the normal state for ClkSM 570 is the idle state ClkIdl 73. Update events created by timing interrupts generated a timing clock cause ClkSM 570 to transition through ClkUpd 577 to update timer values in the timer table.

Now with reference to FIGS. 19, 19A, 20, and 21 the manufacturing state machines RcvSM 580, SndSM 600, and TstSM 610 will be described. These state machines permit the disk drive 2 to be fully configured, operated and exercised during its manufacture, without the presence of the host 1.

Figure 19:
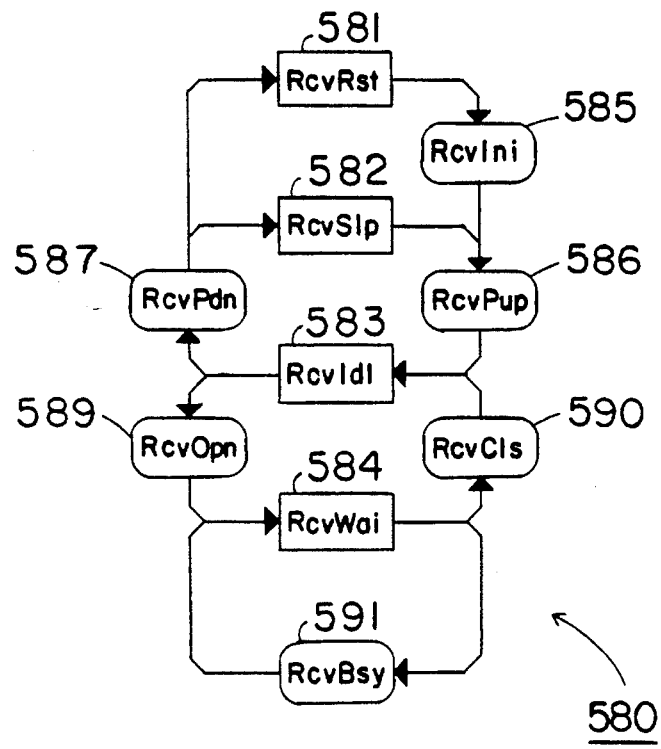
FIG. 19 is a state diagram of the receive state machine shown in FIG. 5B.
Figure 19A:
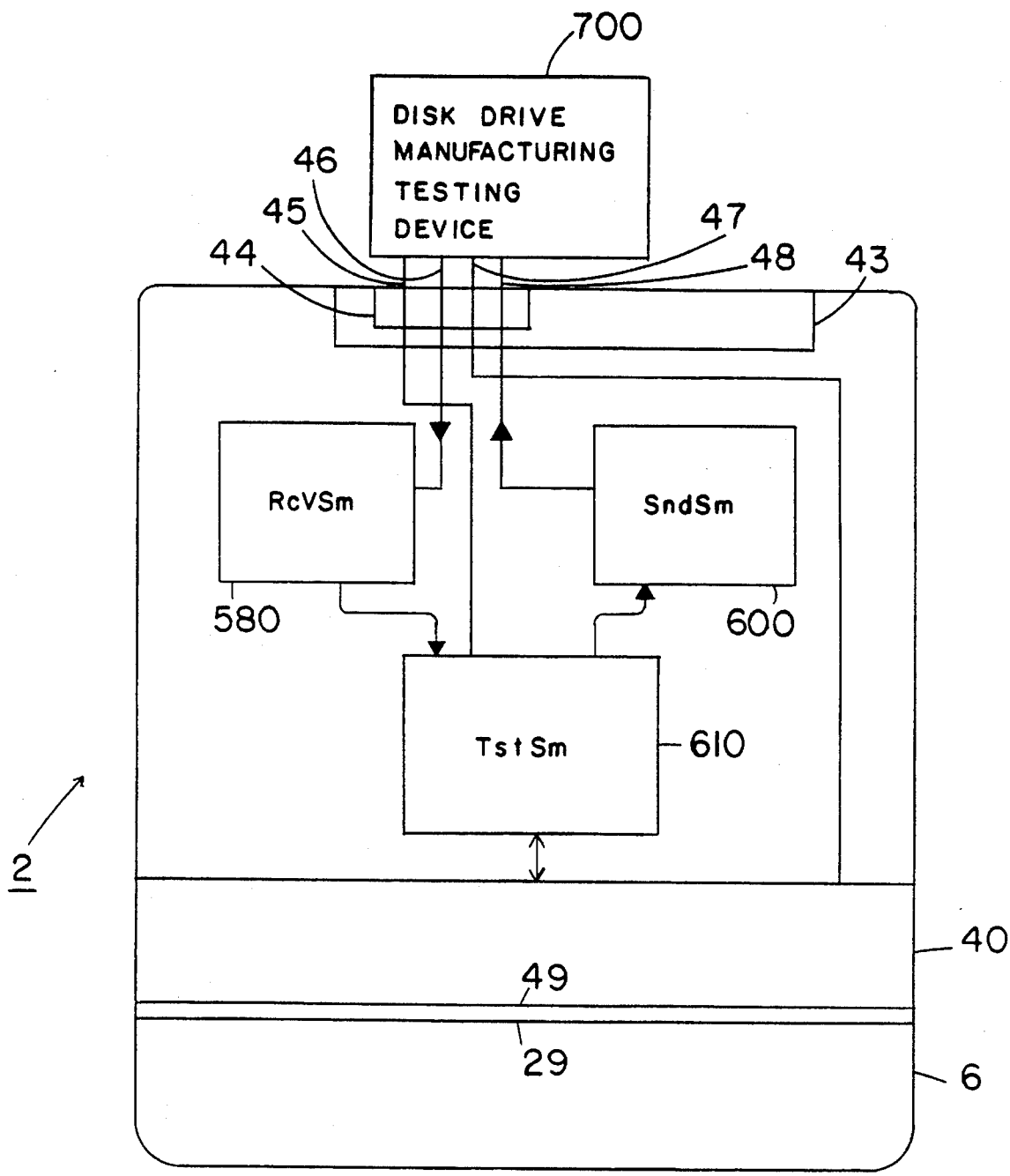
FIG. 19A is block diagram of the disk drive of FIG. 2 in a test configuration.

First with reference to FIG. 19A, there is shown a configuration of the disk drive 2 connected to a disk drive manufacturing testing device 700 by pins 45–48 of the serial port 44 of the I/O connector 43. The testing device 700 is of a type that can be used for testing and exercising disk drives of the type described herein during the assembly thereof. The testing device 700 can also be used to communicate with the engineering state machines, as described hereinafter, to allow for the debugging and testing of the various state machines during a design phase.

The manufacturing state machines 580, 600, and 610 transfer information over the four pin serial port 44. The serial port 44 is capable of channeling 8 bit characters at speeds up to 9600 baud through the serial port 44. Pin 45 is used for enabling the disk drive 2 to operate in test mode. For example, if the signal on pin 45 is low the disk drive 2 operates in test mode, that is the components of the controller 40 and the HDA 6 are under the direct control of the manufacturing state machines RcvSM 580, SndSM 600, and TstSM 610. Otherwise, if the signal on pin 45 is high, the disk drive 2 is operated by signals received through the IDE/AT or SCSI interface via I/O connector 43.

Signals on Pin 46 are used for receiving test character packets from the testing device 700 by RcvSM 580. Signals on Pin 48 are used for transmitting test character packets to the testing device from SndSM 600. 700. Pin 47 supplies power, for example +12 V, to the electrical components of the disk drive 2 during testing. It should be understood that the signals and the pins 45–48 of the I/O connector 43 can be configured in any number of alternative arrangements to define a serial port 44.

Figure 20:
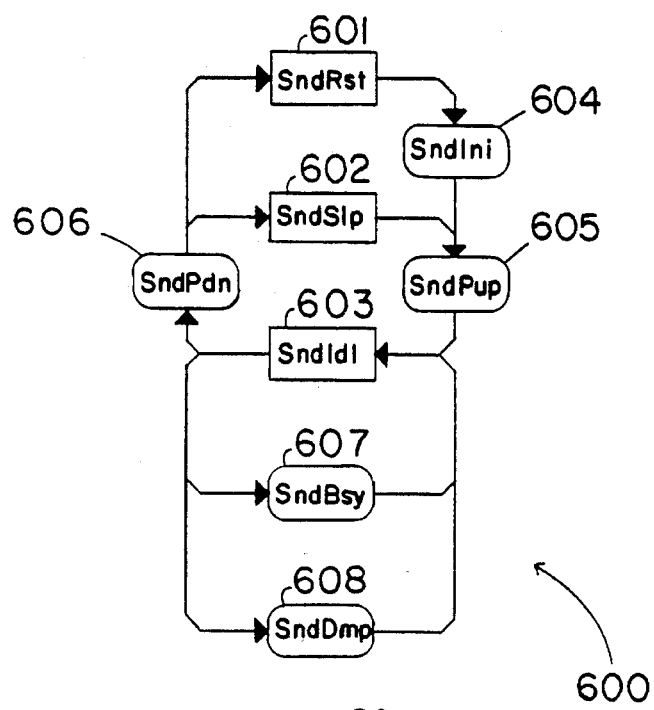
FIG. 20 is a state diagram of the transmit state machine shown in FIG. 5B.
Figure 21:
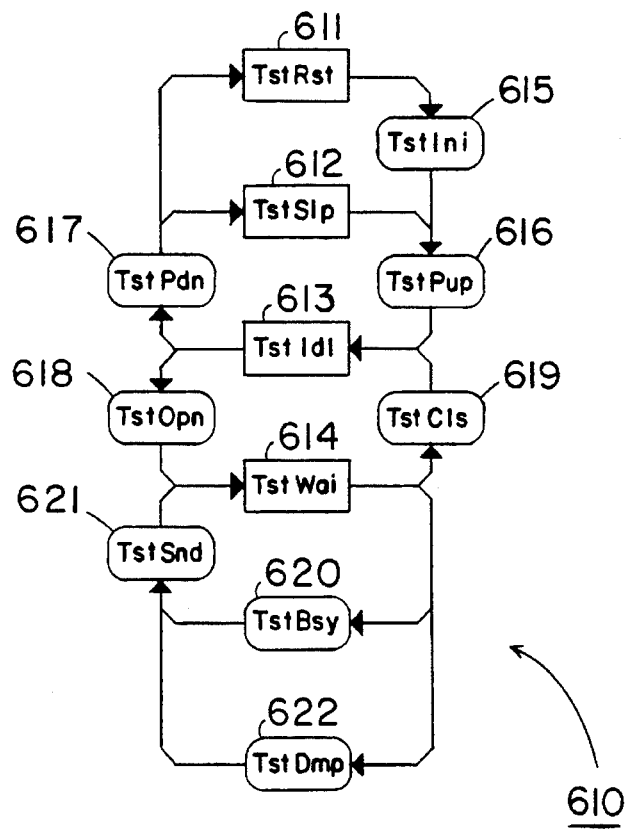
FIG. 21 is a state diagram of the test state machine shown in FIG. 5B.

Now also with reference to FIGS. 19, 20, and 21 the manufacturing state machines are described. FIG. 19 shows the receive state machine RcvSM 580 which includes the steady states RcvRst (reset) 581, RcvSlp (sleep) 582, RcvIdl (idle) 583, and RcvWai (wait) 584. Also shown are the transitional states RcvIni (initialize) 585, RcvPup (power-up) 586, RcvPdn (power-down) 587, RcvOpn (open) 589, RcvCls (close) 590, and RcvBsy (busy) 591.

The receive state machine RcvSM 580 is enabled by the test state machine TstSM 610, as is described below. After initialization (RcvIni 585) and power-up (RcvPup 586), RcvSM 580 will be in the idle state RcvIdl 583 until an event to start receiving test characters from the testing device 700 is received from TstSM 610. The receive event includes as a parameter a count of the number of characters of a character packet that should be received. The state machine will then enter the wait state RcvWai 584 until the transmission is initiated.

In the initialization state, memory space for a receive buffer is allocated in SRAM 62. During testing operations, characters of a packet are received by RcvSM 580 one at the time, that is, an interrupt event is generated for each character received. While characters are being received, RcvSM 580 remains in the busy state RcvBsy 591. After receiving a packet of characters of the predetermined number of characters, RcvSM 580 will revert to the idle state RcvIdl 583, and a software event generated by RcvSm 580 for TstSM 610 indicating the completed reception of the test character packet. Received character packets are stored in the receive buffer.

FIG. 20 shows the state diagram for the transmit (send) state machine SndSM 600. SndSm 600 includes the steady states SndRst (reset) 601, SndSlp (sleep) 602, and SndIdl (idle) 603. Also shown are the transitional states SndIni (initialize) 604, SndPup (power-up) 605, SndPdn (power-down) 606, SndBsy (busy) 607, and SndDmp (dump) 608.

In the initialization state memory space for a transmit buffer is allocated in SRAM 62. During operation SndSM 600 transmits character packets over the serial port 44. Transmitted characters are initiated by passing the address of the transmit buffer to the transmit state machine SndSM 600. The first byte in the transmit buffer is the number of bytes to be transmitted in a packet. An interrupt event is generated by SndDmp 608 at the end of transmission of the packet.

FIG. 21 shows the state diagram for the test state machine TstSM 610 which includes the steady states TstRst (reset) 611, TstSlp (sleep) 612, TstIdl (idle) 613, and TstWai (wait) 614. Also shown are the transitional states TstIni (initialize) 615, TstPup (power-up) 616, TstPdn (power-down) 617, TstOpn (open) 618, TstCls (close) 619, TstBsy (busy) 620, an TstDmp (dump) 622.

The test state machine 610 manages the testing of the disk drive 1 in conjunction with RcvSM 580 and SndSM 600. TstSM 610 after initialization (TstIni 615) and power-up (TstPup 616) is normally in an inactive or idle state TstIdl 613. By means of an event signal on the control pin 45. For example, if the signal on pin 45 is low, the state machine TstSM 610 is placed in an active or wait state TstWai 614.

When in TstWai 614, TstSM 610 signals the RcvSM 580 to also enter its wait state RcvWai 584 to receive a test character packet. The character packets can include requests to perform any drive functions, for example seeking, reading, writing, formatting, and the like, to fully exercise the disk drive 2 in stand-alone mode.

FIGS. 22, 22A, 23, and 24 and the accompanying text describe the break (BrkSM 630), trace, (TrcSM 650), and opcode (OpcSM 670) state machines which are available for testing and debugging the operation of the various state machines of the disk drive 2.

Traditional debugging tools, other than multi-channel analyzers and scopes, are generally specific for a particular microprocessor, and generally only allow the linear tracking of a microprocessor executing machine instructions one at the time. The controller 40 of the disk drive 2 includes several independently operating microprocessors of different makes, which would therefore require several concurrently operating debugging tools. Without complex time tracking and concurrent analysis, a traditional debugging tool's output would lie extremely difficult to use.

Now that it is understood that the collection of event driven software state machines operate concurrently, and to a large part asynchronously, but yet cooperatively, it should be apparent that only by testing and tracing the transitions of the entire ensemble of state machines that the operation of the disk drive 2 could be fully understood and debugged.

In addition, the inventor realized that the debugging tool would have to operate in testing the drive 2 operations without seriously impacting or delaying time critical functions. For these and other reasons, the debugging tool as disclosed herein, is also implemented as a collection of event driven software state machines cooperating with the state machines as described above.

As a brief introduction, a debugging tool, embodying the invention, allows the design engineer to track and trace the operation of the disk drive 2 by logging various indicators expressive of the operation of the state machines. The indicators being the state status register (SAR) 254 and the state address register (SSR) 250, of FIG. 6, as well as the events that drive the machines themselves, hereinafter, with respect to the debugging tool, also called operation codes or opcodes. The break state machine BrkSM 630 is used to log SARs, the trace state machine TrcSM 650 is used to log SSRs, and the opcode state machine OpcSM 670 is used to log opcodes (events).

The state machine indicators are logged, as will be described, in circular buffers in SRAM 62. There is a circular buffer for each engineering state machine. Logging begins upon activation by a log event generated by each of the respective engineering state machines. In addition, a time stamp is also logged with each indicator in order to allow the design engineer to unravel critical events and state transitions. If a logged indicator has the same value as a predetermined trigger value, logging is stopped and the content of the circular buffer is dumped to the testing device 700 of FIG. 19A for inspection by the design engineer.

The engineering state machines are operated, for example, through the manufacturing state machines described above. That is, requests to activate the debugging state machines are received by the disk drive 2 from the testing device 700 of FIG. 19A, via the serial port 44 and RcvSM 580, when the disk drive 2 is operating in test mode configuration as shown in FIG. 19A. Similarly, logged information captured during a debugging session is dumped back to the testing device 700, through SndSM 600 and the serial port 44, to the testing device 700. In other words, the engineering state machines are controlled through events generate by TstSM 610 of FIG. 21.

Figure 22:
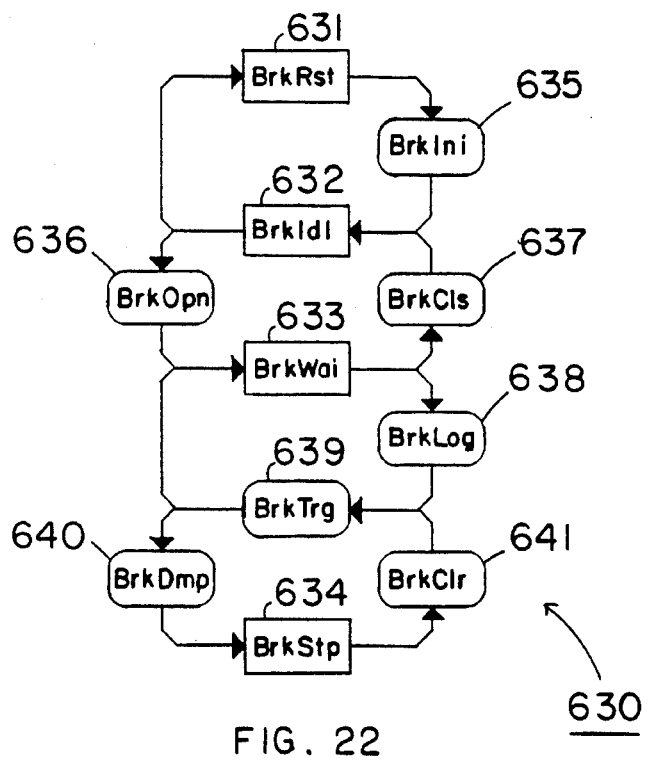
FIG. 22 is a state diagram of the break state machine shown in FIG. 5B.
Figure 22A:
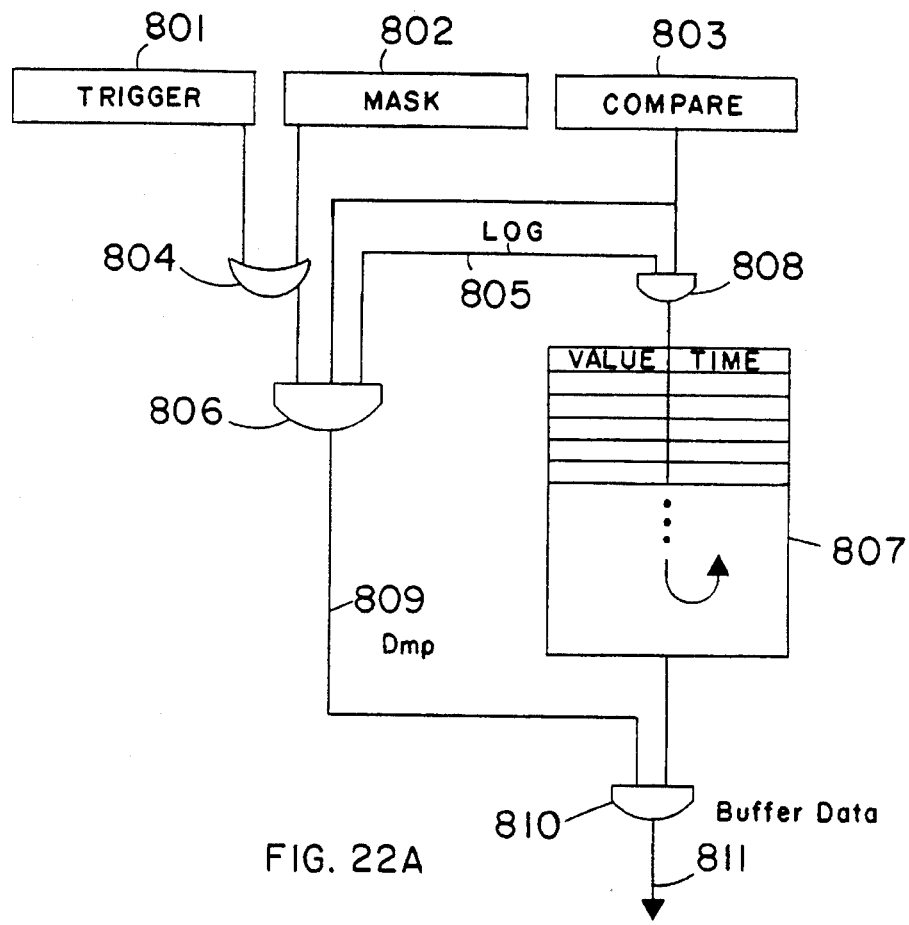
FIG. 22A is a logic diagram of the engineering state machines.

First with reference to FIG. 22A, the general logical components and functions of the engineering state machines 630, 650, and 670 are described. It should be understood that even though the functions and components are shown in the form of a logic diagram for clarity purposes, the debugging tool as described herein is implemented in its entirety as a collection of event driven software state machines.

FIG. 22A shows a trigger register 801, a mask register 802, and a compare register 803. The outputs of the trigger and mask registers 801 and 802 are coupled to an OR function 804. The outputs of the compare register 803, the output of the OR function 804, and a Log signal 805 are coupled to a first AND function 806. The outputs of the compare register 803 and the Log signal 805 are also coupled to a second AND function 808. The output of the second AND function 808 are coupled to a circular buffer 808. The output of the first AND function 806 and the output of the circular buffer 807 are coupled to a third AND function 810.

During the operation of the engineering machines, the trigger register 801 and the mask register 802 are loaded with a trigger values and a mask value received via RcvSM 580 and TstSM 610, from the testing device 700 as a character packet. The trigger value is the value of an indicator of interest during a particular debugging session. The mask value is used to mask out bits of no interest in the trigger register.

To start a logging or debugging session the Log signal 805 is asserted by a log event. During logging, the state machine indicators are loaded in the compare register 803, and in the presence of the Log signal 805 the indicators are stored sequentially in the circular buffer 807 by the AND function 808. A time stamp is logged with each logged indicator.

Functions 804 and 806 compare the values of the registers 801, 802, 803, and generated a Dmp signal 809 if true. The presence of the Dmp signal will activate function 810 to dump the circular buffer, clear it, and resume logging, as long as the Log signal 805 remains asserted. Deasserting the Log signal will terminate logging.

Now also with reference to the state diagram of FIG. 22 the BrkSM 630 will be described. BrkSM 630 includes steady states BrkRst (reset) 631, BrkIdl (idle) 632), BrkWai (wait) 633, and BrkStp (stop) 634. Also shown are the transitional states BrkIni (initialize) 635, BrkOpn (open) 636, BrkCls (close) 637, BrkLog (log) 638, BrkTrg (trigger) 639, BrkDmp (dump) 640, and BrkClr (clear) 641.

In the initialization state memory space for the break circular buffer is allocated in SRAM 62. After initialization the break state machine is normally in the idle state BrkIdl 632. Upon receipt of an open event with accompanying parameters the trigger register 801, of FIG. 22A, for BrkSM 630 is loaded with a predetermined SAR 254 value. The open event also loads the corresponding mask register 802 with a masking value. The mask register 802 is used to mask-out selected bits of the trigger register 801 that are deemed to be of no significance for the current debugging session. After the registers 801 and 802 have been loaded BrkSM transitions to the wait state BrkWai 633.

Upon the receipt of a log event, BrkSM 630 transitions to the log state BrkLog 638, and logging commences. While in BrkLog 638, any state transition for any of the above described state machines will cause the current SAR 254 to be logged in the BrkSM 630 circular buffer 807. After logging the SAR 254 is compared with the trigger and mask registers 801 and 802, as shown in FIG. 22A. If the SAR 254 is the same as the contents of the trigger register, 801 (as masked by the mask register 802) a trigger event is generated and BrkSM 630 transitions to BrkTrg 639. Subsequently a dump event is generated, and BrkSM 630 transitions to BrkDmp 640 to dump the circular buffer 807.

After the circular buffer 807 is dumped, the buffer 807 is cleared in clear state BrkClr 641 and logging resumes. A stop logging event will disable logging, and BrkSM 630 transitions to the wait state BrkWai 633. A close event will clear the values from the trigger and mask register 801 and 802 and transition BrkSM 630 to its normal idle state BrkIdl 632.

Figure 23:
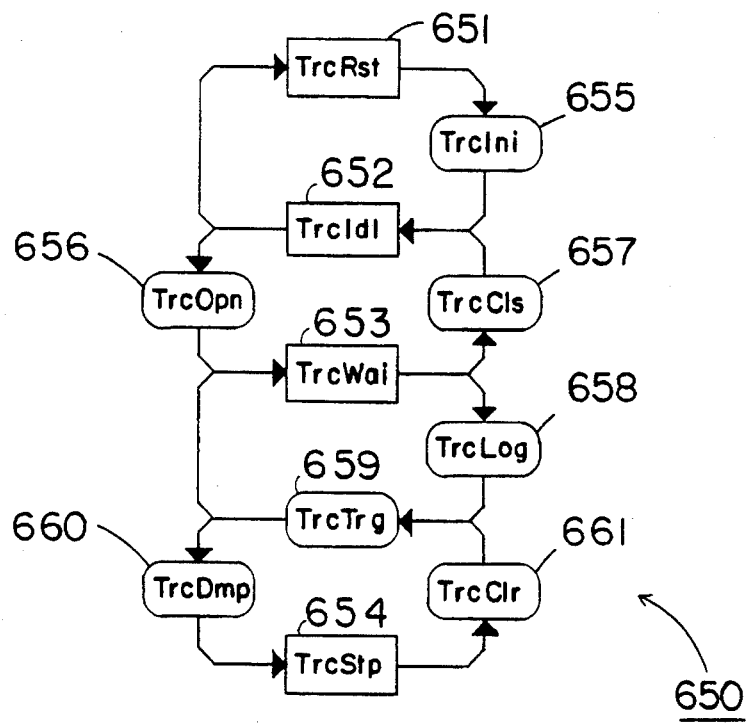
FIG. 23 is a state diagram of the trace state machine shown in FIG. 5B.

FIG. 23 shows the state diagram of the trace machine TrcSM 650 which includes the steady states TrcRst (reset) 651, TrcIdl (idle) 652, TrcWai (wait) 653, and TrcStp (stop) 654. Also shown are the transitional states TrcIni (initialize) 654, TrcOpn (open) 656, TrcCls (close) 657, TrcLog (log) 658, TrcTrg (trigger) 659, TrcDmp (dump) 660, and TrcClr (clear) 661.

During operation the trace state machine TrcSM 650 logs (TrcLog 658) in the trace circular buffer 807 the time stamped state status registers SSR 250, including the state number SN 251 and state error code EC 253, for each state as it is activated by an event. Note here how the mask register 802 can be used to ignore either the EC 253, or the TM 252, or both.

Figure 24:
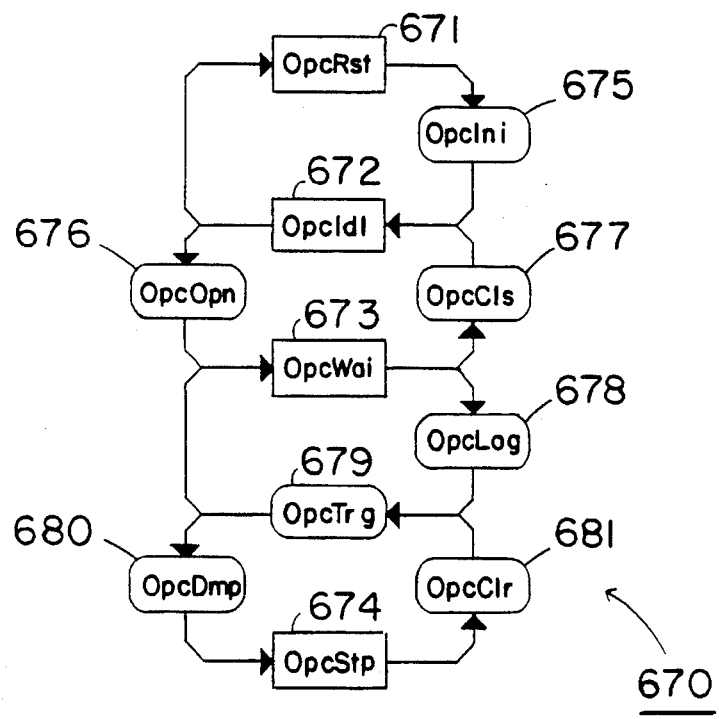
FIG. 24 is a state diagram of the opcode state machine shown in FIG. 5B.

FIG. 24 shows state diagram of the opcode machine OpcSM 670 which includes the steady states OpcRst (reset) 671, OpcIdl (idle) 672), OpcWai (wait) 673, and OpcStp (stop) 674. Also shown are the transitional states OpcIni (initialize) 675, OpcOpn (open) 676, OpeCls (close) 677, OpcLog (log) 678, OpcTrg (trigger) 679, OpcDmp (dump) 680, and OpcClr (clear) 681.

During operation the opcode state machine OpcSM 670 logs (OpcLog 678) in an opcode buffer each software event (opcode) generated by the various state machines during their operation, the time stamp.

The following table compares the computed power consumption of various electrical components, of a disk drive using traditional polling driven state machine software, and a comparable disk drive using the event driven software state machines embodying the invention. The table shows the rate of power consumption for various disk drive activities or machine states.

| STATE | POLLING | EVENT |
| --- | --- | --- |
| Spin-up | 2950 | 1958 mwatts |
| Read/Write | 1950 | 1034 mwatts |
| Idle | 1700 | 601 mwatts |
| Standby | 1300 | 200 mwatts |
| Sleep | 50 | 50 mwatts |

While there has been shown and described a preferred embodiment, it is to be understood that various other adaptations and modifications may be made within the spirit and scope of the invention as defined by the appended claims.

What is claimed is:

1. A computer peripheral control system for controlling operations of a computer peripheral device and including a processor for executing instructions and a memory for storing the instructions and a plurality of hardware subsystems of the device being connected to and controlled by said processor, and further comprising:

clock means for driving the processor at a predetermined clock rate;

a plurality of operation software state machines, each of said plurality of operation state machines having a plurality of steady states bridged by transitional states, at least a first one of the steady states being a power reduced steady state and at least a second one of the steady states being a ready steady state, and comprising a sequence of instructions stored in the memory and executed in the processor, and each of said plurality of state machines for operating a corresponding one of the hardware subsystems of the device connected to the processor, an active one of said plurality of operation state machines executing instructions in the processor at a particular time;

event generating means within at least some of the hardware subsystems for generating an event;

event identification means within the processor, responsive to said event, for identifying the event for identifying one the hardware subsystems associated with the event and for identifying one of said plurality of operation state machines to process said event by executing instructions of said at associated operation state machine in the processor, said associated state machine thereupon transitioning through transitional states until a subsequent steady state is reached and operating particular hardware components of said associated one of the hardware subsystems;

said processor including event completion detection means for detecting arrival of said associated state machine at said subsequent steady state, said associated operation state machine being responsive to the event completion detection means and including a power down transitional slate reached from said subsequent steady state for transitioning said associated operation state machine to the first power reduced steady state for decreasing power to said particular hardware components.

2. The system as in claim 1 wherein said event is a hardware interrupt.

3. The system as in claim 1 wherein said event is a software subroutine call.

4. The system as in claim 2 or 3 further comprising:

means responsive to said event, for saving a context of the processor; and, means, responsive to completion of executing instructions to process said event, for restoring said context of the processor.

5. The system as in claim 1 further comprising:

said event completion detection means including timer means for timing a predetermined time period following detection of arrival of said at least one operation state machine at said subsequent steady state and for generating a time-delayed event after expiration of a predetermined time period; and said at least One operation state machine transitioning through said power down transitional state to reach said power reduced steady state in response to said time-delayed event, for decreasing power to said particular hardware components.

6. The system as in claim 1 wherein said computer peripheral device comprises a hard disk drive of the computer system.

7. The system as in claim 6 wherein said corresponding hardware components include a disk spindle motor and spindle driver chip controlled by a spindle state machine being one of said operation state machines, a bus driver chip controlled by a host state machine being another one of said operation state machines, a servo mechanism including an actuator driver chip and a voice coil actuator and controlled by a servo state machine being a further one of said operation state machines, the hard disk drive including a plurality of circumferentially spaced apart servo spokes recorded on at least one surface of a rotating disk and read by a data transducer head positioned by the voice coil actuator and a read/write driver chip in electrical connection with the data transducer head and controlled by a sector state machines being a still further one of said operation state machines, and where said spindle, host, servo, and sector state machines include transitional states leading to steady states for increasing and decreasing power to operate said corresponding hardware components at controlled power levels.

8. The apparatus as in claim 1 wherein each of said plurality of operation state machines has a priority level and said processor includes means for interrupting instruction execution by said active operation state machine upon receipt of an interrupt corresponding to another one of the operation state machines if said priority level of said active state machine is lower than said priority level of said another one.

9. The apparatus as in claim 1 wherein each said operation state machine further comprises:

a plurality of steady states having instructions for executing in the processor, a first one of said plurality of steady states requiring a first power level to operate said particular hardware components during said first state, and a second one of said plurality of steady states requiting a second power level to operate said particular hardware components during said second state;

transition state means, responsive to processing said event, for transitional said particular state machine from said first steady state to said second steady state; and power control transition state means, responsive to said transition state means, for controlling said means for increasing and decreasing power to said particular hardware components between said first power level and said second power level.

10. A computer hard disk drive system comprising a base, a data storage disk rotating relative to the base and defining a multiplicity of data tracks interrupted by servo spokes, a rotary voice coil actuator mounted to the base, a data transducer head positioned relative to the data tracks and servo spokes by the rotary voice coil actuator, and an electrical control system mounted to the base and including:

a processor for executing instructions;

clock means for driving the processor at a predetermined clock rate;

a memory for storing said instructions while the processor is executing said instructions;

a spindle motor subsystem for rotating said data storage disk, an actuator control subsystem including the rotary voice coil actuator, a servo spoke subsystem selectively connected to the data transducer head for reading servo head position information recorded in each spoke, and a host interface bus driver circuit and buffer memory subsystem, each said subsystem being coupled to said processor, said plurality of subsystems requiring power to operate;

a plurality of software state machines defined as event driven program structures in said memory using said instructions, each of the plurality of software state machines defining a plurality of steady states bridged by a plurality of transition states, each software state machine including at least a power reduced steady state and a ready steady state, and at least one of said subsystems being associated with each of said plurality of software state machines;

means responsive to said subsystems for generating an event;

means, responsive to said event, for identifying a particular one of said plurality of software state machines to execute said instructions in said processor to process said event;

said particular one of software state machine reaching said a power reduced steady state through a power down transition state responsive to a completion of processing said event, for withdrawing power from said at least one of said plurality of hardware components.

* * * * *